(12) United States Patent  (10) Patent No.: US 7,810,050 B2
Hirai et al.  (45) Date of Patent: Oct. 5, 2010

(54) USER INTERFACE SYSTEM

(75) Inventors: Takuya Hirai, Osaka (JP); Atsushi Yamashita, Osaka (JP); Atsushi Iisaka, Osaka (JP); Tomohiro Terada, Osaka (JP)

(73) Assignee: Panasonic Corporation, Osaka (JP)

( * ) Notice: Subject to any disclaimer, the term of this patent is extended or adjusted under 35 U.S.C. 154(b) by 628 days.

(21) Appl. No.: 11/884,955

(22) PCT Filed: Mar. 28, 2006

(86) PCT No.: PCT/JP2006/306245
§ 371 (c)(1),
(2), (4) Date: Aug. 23, 2007

(87) PCT Pub. No.: WO2006/104132
PCT Pub. Date: Oct. 5, 2006

(65) Prior Publication Data
US 2008/0163131 A1 Jul. 3, 2008

(30) Foreign Application Priority Data
Mar. 28, 2005 (JP) ............................. 2005-092434

(51) Int. Cl.
*G06F 3/00* (2006.01)
*G06F 3/033* (2006.01)
*G06F 3/041* (2006.01)
(52) U.S. Cl. ......................... 715/863; 715/866; 345/173
(58) Field of Classification Search .................. 715/863, 715/866; 345/173
See application file for complete search history.

(56) References Cited
U.S. PATENT DOCUMENTS
5,479,528 A  12/1995  Speeter
(Continued)

FOREIGN PATENT DOCUMENTS

| CN | 1570960 | 1/2005 |
|---|---|---|
| JP | 02-132510 | 5/1990 |
| JP | 06-083523 | 3/1994 |

(Continued)

OTHER PUBLICATIONS

Atsushi Sugiura, Yoshiyuki Koseki A User Interface Using Fingerprint Recognition—Holding Commands and Data Objects on Fingers UIST '98 ACM pp. 71-79.*

*Primary Examiner*—William L Bashore
*Assistant Examiner*—Andrea N Long
(74) *Attorney, Agent, or Firm*—Wenderoth, Lind & Ponack, L.L.P.

(57) ABSTRACT

A user interface system having an improved usability is provided. The user interface system comprises: an operation section (21) an operation section for receiving an instruction inputted by a user; a finger position detecting section (32) for detecting a group of first coordinate values, each indicating a current position of a fingertip, of a user, which is placed on an operation surface of the operation section; a component storing section (4) for storing component data representing a GUI (Graphical User Interface) component; an assignment section (34) for uniquely assigning the component data stored in the component storing section to each of the first coordinate values detected by the finger position detecting section (32); an image generating section (35) for generating a GUI image representing a user interface in which the GUI component represented by the component data stored in the component storing section (4) is uniquely associated with each of the first coordinate values detected by the finger position detecting section (32), in accordance with an assignment performed by the assignment section; and a display controlling section (36) for displaying the GUI image generated by the image generating section (35) on a display screen.

12 Claims, 30 Drawing Sheets

U.S. PATENT DOCUMENTS

| | | | |
|---|---|---|---|
| 5,767,842 A * | 6/1998 | Korth | 345/168 |
| 5,835,079 A * | 11/1998 | Shieh | 345/173 |
| 6,519,607 B1 * | 2/2003 | Mahoney et al. | 707/769 |
| 2002/0075239 A1 * | 6/2002 | Potkonen | 345/168 |
| 2002/0075334 A1 * | 6/2002 | Yfantis | 345/863 |
| 2002/0130844 A1 * | 9/2002 | Natoli | 345/168 |
| 2005/0104867 A1 * | 5/2005 | Westerman et al. | 345/173 |
| 2009/0037623 A1 * | 2/2009 | Ghassabian | 710/67 |

FOREIGN PATENT DOCUMENTS

| | | |
|---|---|---|
| JP | 10-040014 | 2/1998 |
| JP | 2001-070293 | 3/2001 |
| JP | 2003-529130 | 9/2003 |

* cited by examiner

F I G. 4
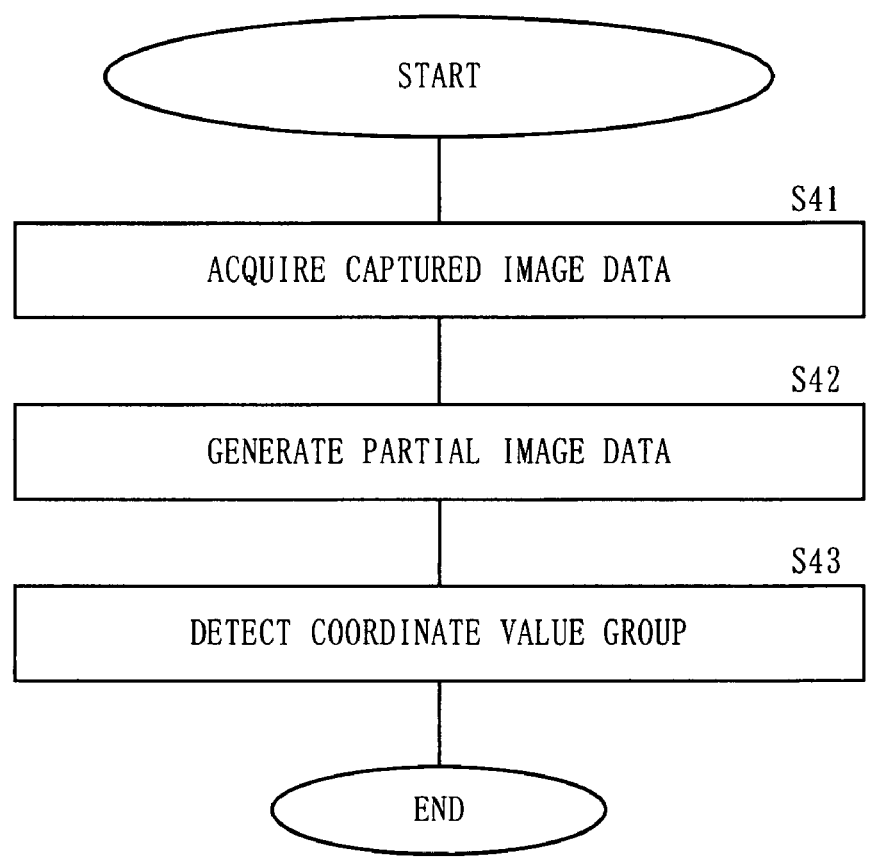

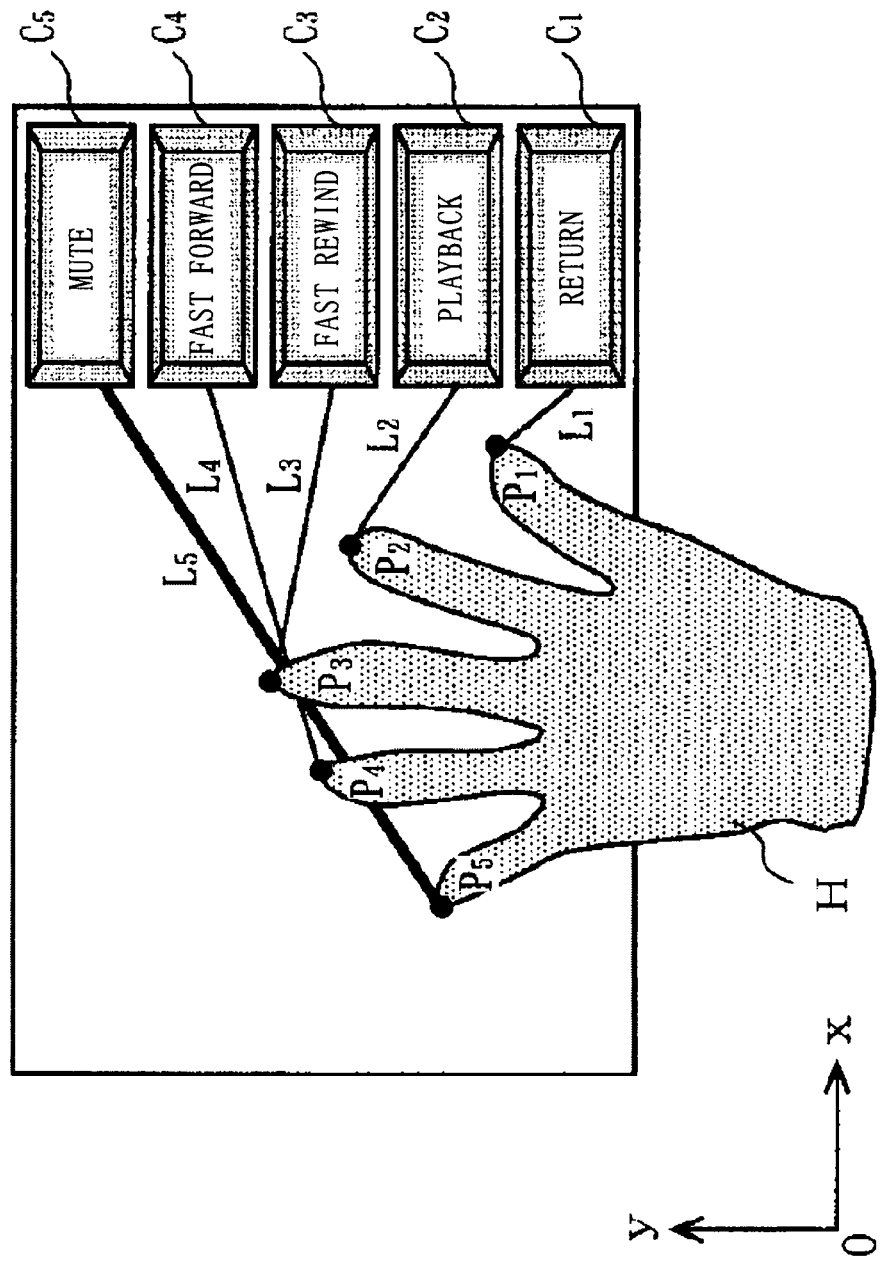

F I G. 1 0
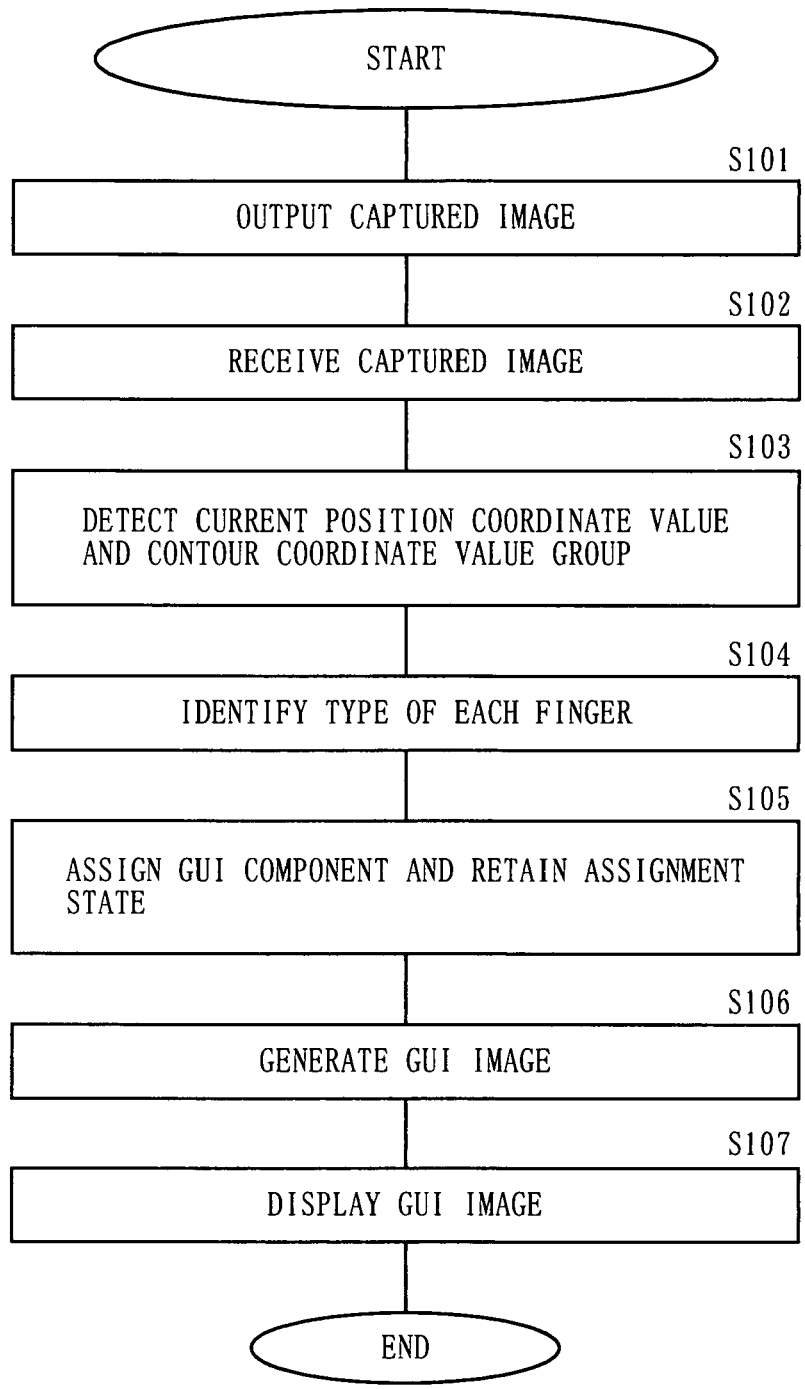

F I G. 1 5
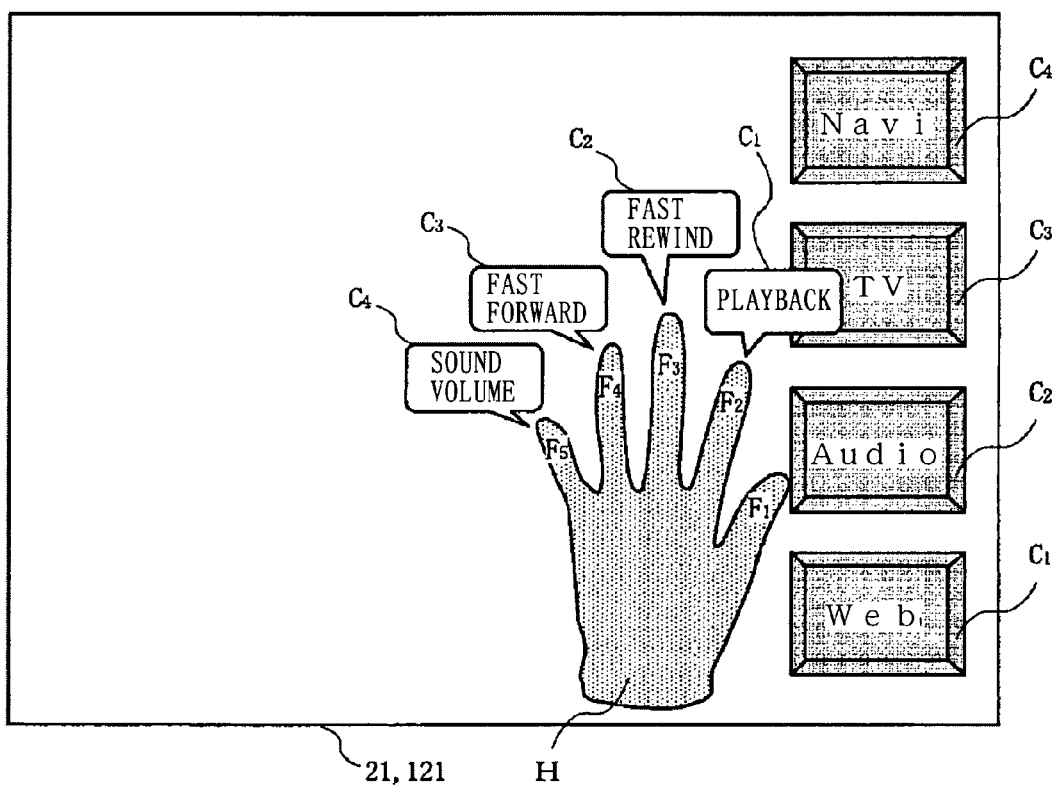

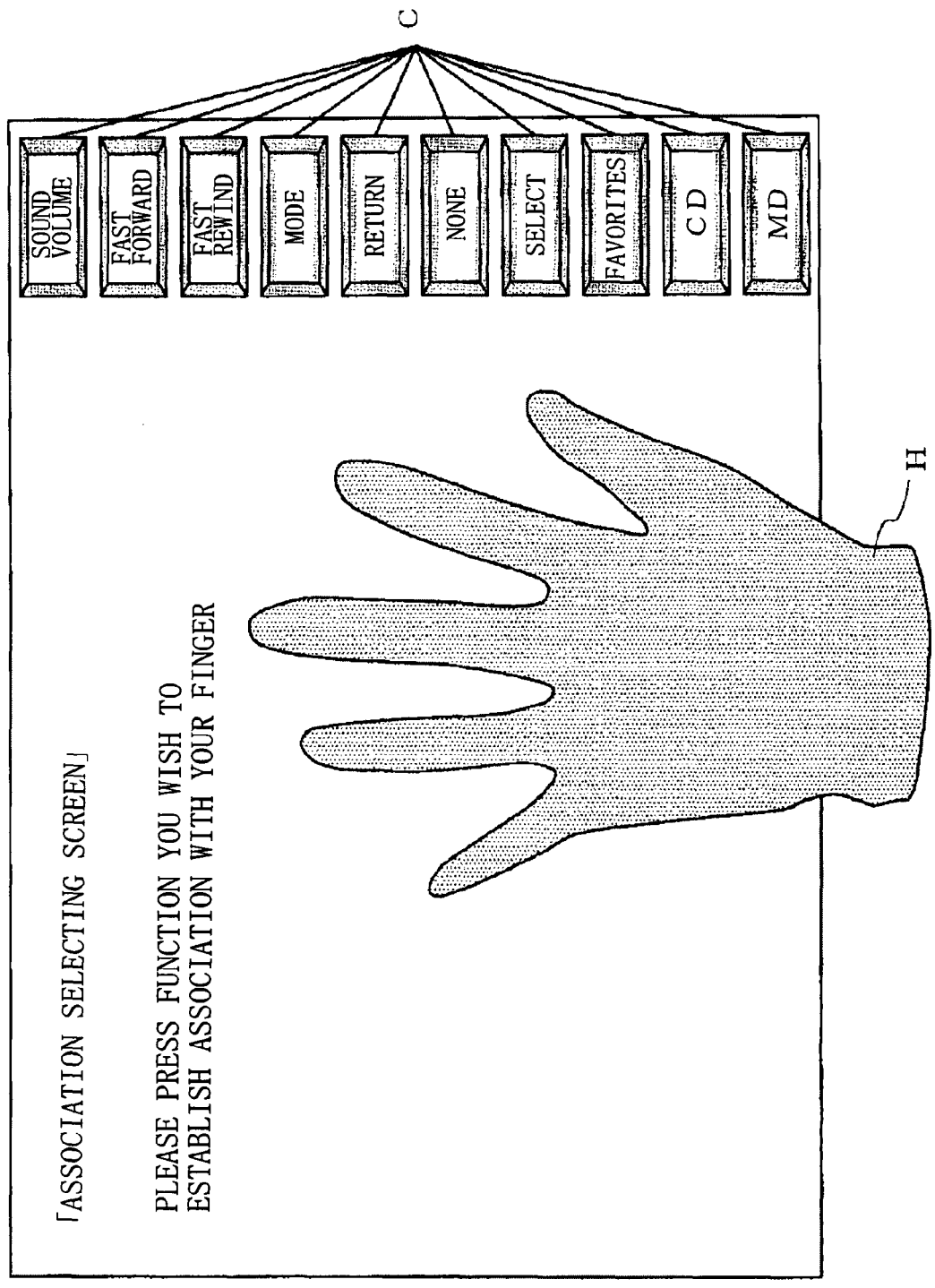

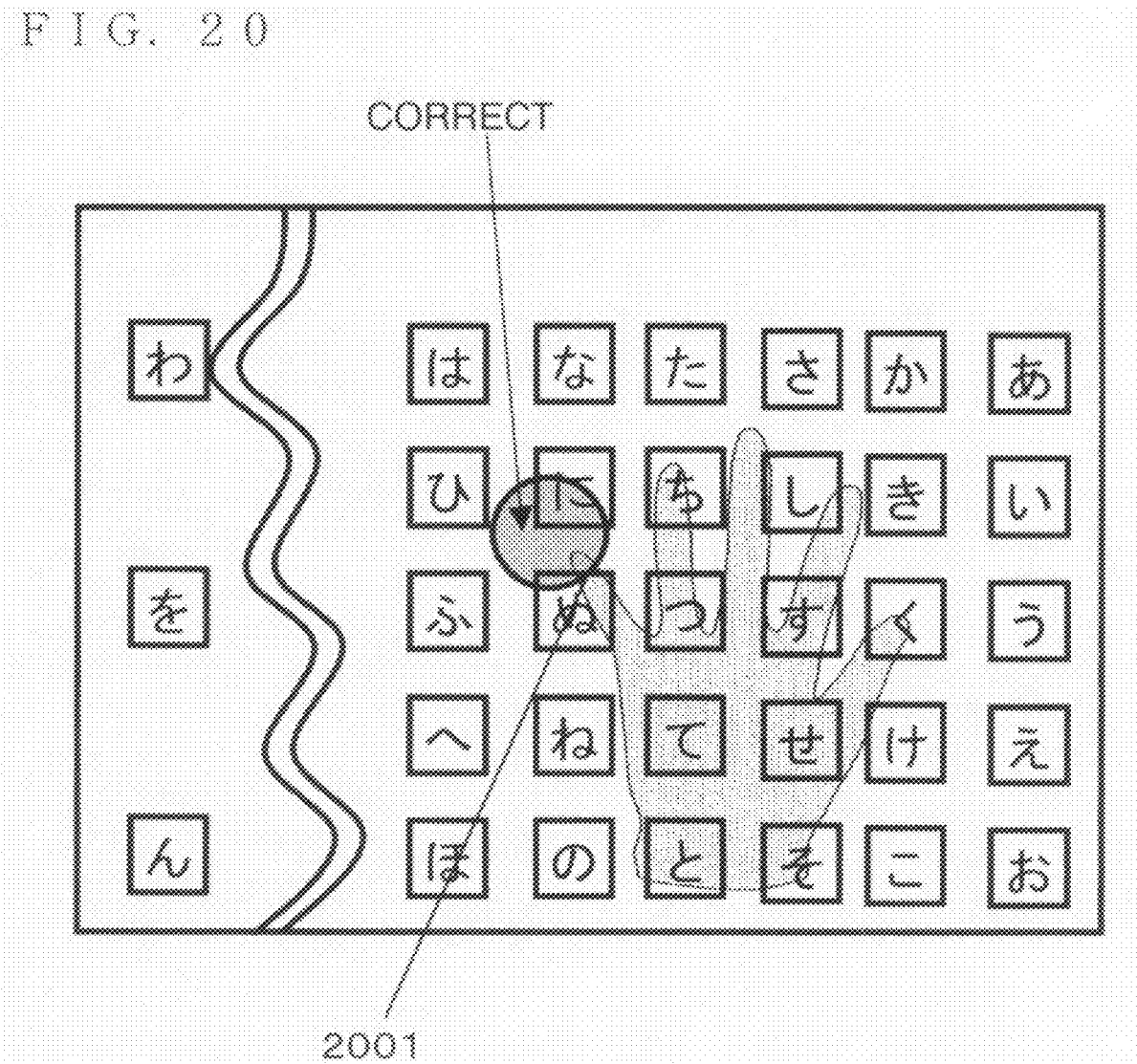

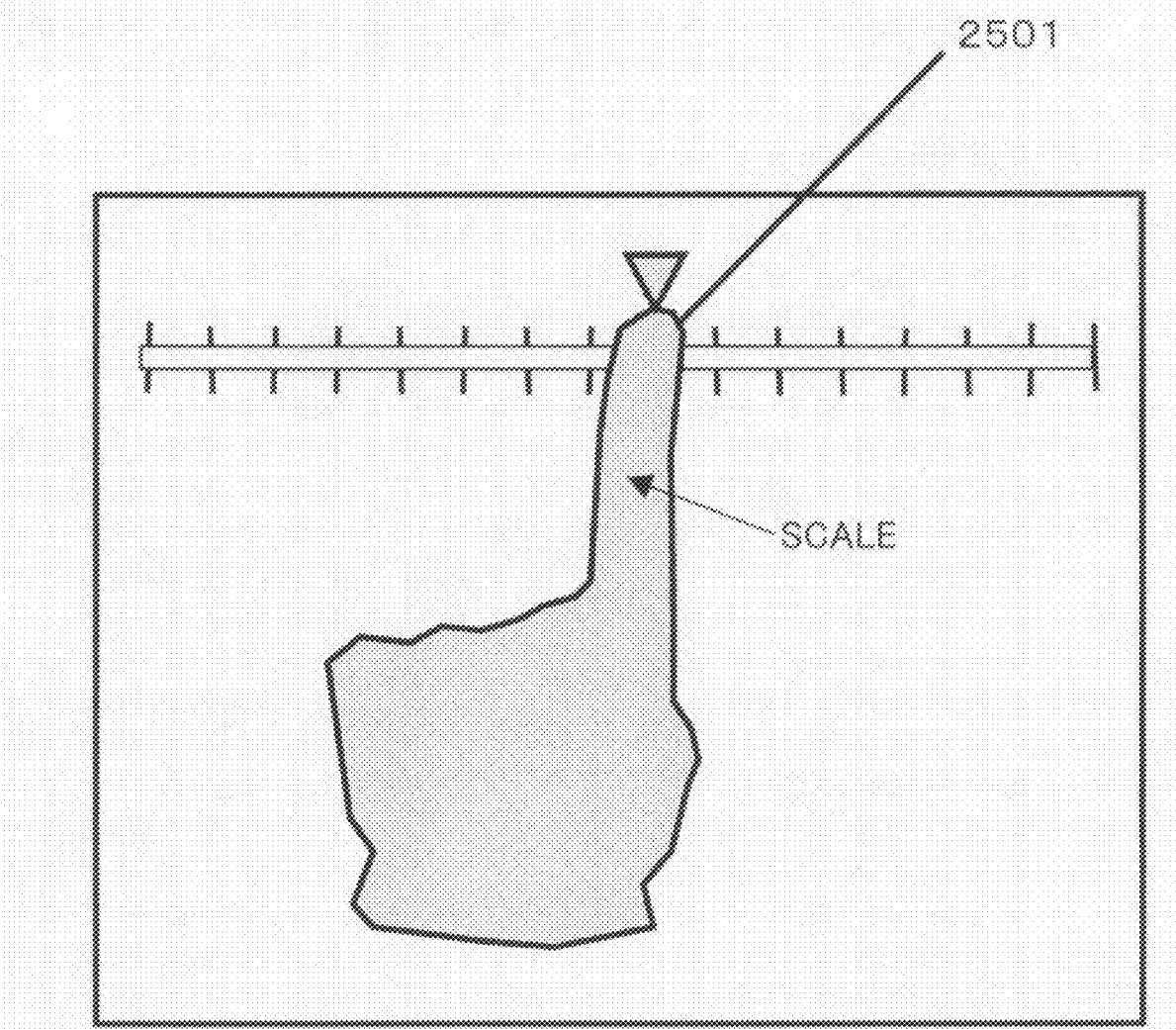

USER INTERFACE SYSTEM

TECHNICAL FIELD

The present invention relates to a user interface system, and more particularly to a user interface system capable of allowing a user to designate a function to be executed by a computer device.

BACKGROUND ART

In recent years, various user interface systems have been proposed. In a certain user interface system among the proposed user interface systems, groups including letters of the alphabets, numbers and commands are registered, and these groups are divided into subgroups. Each of the subgroups is associated with a portion of a finger of a user. Also, the user interface system comprises a keypad including a plurality of keys, and at least one of the letters of the alphabets, numbers and commands is assigned to each of the plurality of keys. Furthermore, the user interface system comprises a finger recognition system. The finger recognition system recognizes a finder contacting a key, and selects one of the subgroups assigned to the finger interacting with the key.

[Patent document 1] Japanese Unexamined Patent Publication No. 2003-529130

DISCLOSURE OF THE INVENTION

Problems to be Solved by the Invention

As described above, in the user interface system, each of the subgroups is associated with the finger of the user, and the finger recognition system recognizes the finger currently operating a key, thereby specifying one of the subgroups. In other words, since descriptions on the letter of the alphabets, numbers and commands are not displayed on the keypad, the user must memorize a finger with which each of the subgroups is associated. Thus, there has been a problem in that the user interface system has a poor usability.

Therefore, an object of the present invention is to provide a user interface system having an improved usability.

Solution to the Problems

To achieve the above object, a first aspect of the present invention is directed to a user interface system. The present invention comprises: an operation section for receiving an instruction inputted by a user; a finger position detecting section for detecting a group of first coordinate values, each indicating a current position of a fingertip, of the user, which is placed on an operation surface of the operation section; a component storing section for storing component data representing a GUI (Graphical User Interface) component; an assignment section for uniquely assigning the component data stored in the component storing section to each of the first coordinate values detected by the finger position detecting section; an image generating section for generating a GUI image representing a user interface in which the GUI component represented by the component data stored in the component storing section is uniquely associated with each of the first coordinate values detected by the finger position detecting section, in accordance with an assignment performed by the assignment section; and a display controlling section for displaying the GUI image generated by the image generating section on a display screen.

Also, it is preferable that the user interface system further comprises an image pickup device set so as to be able to image an operation performed with a hand of the user, wherein the finger position detecting section detects, in an image captured by the image pickup device, the group of first coordinate values, each indicating the current position of the fingertip, of the user, which is placed on the operation surface of the operation section.

Also, it is preferable that the user interface system further comprises a function executing section for erasing the GUI component associated with a finger bent by the user among fingers included in a hand image captured by the image pickup device, and for executing a function of the GUI component assigned to one of the coordinate values, which indicates the current position of the fingertip corresponding to a last remaining finger.

It is preferable that the image generating section generates the GUI image in which the position indicated by each of the first coordinate values detected by the finger position detecting section is connected, by a line, to the GUI component represented by the component data assigned by the assignment section.

It is preferable that the image generating section further includes a history information retaining section for storing a function which has been previously executed, and generates the GUI image to be assigned to the fingertip based on history information stored in the history information retaining section.

It is preferable that the image generating section superimposes the GUI component represented by the component data assigned by the assignment section on a display image at the position indicated by each of the first coordinate values detected by the finger position detecting section or in a vicinity thereof.

It is preferable that the image generating section further includes a right-or-left-hand determining section for determining whether a right hand is used to perform an operation or a left hand is used to perform the operation, and the GUI component assigned to each of the first coordinate values is changed in accordance with whether the right hand is used to perform the operation or the left hand is used to perform the operation.

It is preferable that the user interface system further comprises a finger identifying section for identifying a plurality of finger types to which the first coordinate values, detected by the finger position detecting section, are respectively assigned.

It is preferable that the display controlling section displays a hand image including the first coordinate values, each indicating the position of the fingertip corresponding to each of the plurality of fingers types identified by the finger identifying section, and after the assignment section uniquely assigns the GUI component to each of the first coordinate values, each indicating the position of the fingertip corresponding to each of the plurality of finger types identified by the finger identifying section, the display controlling section erases the displayed hand image.

It is preferable that the display controlling section displays each of the plurality of finger types to which the GUI component, which is assigned, by the assignment section, to each of the first coordinate values, each indicating the position of the fingertip corresponding to each of the plurality of finger types identified by the finger identifying section, corresponds.

It is preferable that the image generating section generates the GUI image in which a size of the GUI component stored in the component storing section is changed in accordance with the plurality of finger types identified by the finger identifying section.

It is preferable that the display controlling section displays the GUI component, assigned by the assignment section, to a specific fingertip indicated by one of the first coordinate values detected by the finger position detecting section, in accordance with a movement of the specific fingertip.

It is preferable that the display controlling section displays the GUI component, assigned by the assignment section, to a specific fingertip so as to move in accordance with a movement of the specific fingertip indicated by one of the first coordinate values detected by the finger position detecting section.

It is preferable that the assignment section retains only an assignment of a specific one of the first coordinate values detected by the finger position detecting section, and changes assignments of the other of the first coordinate values detected by the finger position detecting section.

It is preferable that the user interface system further comprises: a contact position detecting section for detecting a second coordinate value indicating a position, on the operation surface of the operation section, which is in contact with the user; a contact finger determining section for determining a finger type the user uses to contact the operation surface, based on the second coordinate value detected by the contact position detecting section and each of the first coordinate values to which the GUI component is uniquely assigned by the assignment section, and further specifies the GUI component assigned to the fingertip corresponding to the finger type; and a function executing section for executing a function assigned to the GUI component which is specified by the contact finger determining section.

It is preferable that in response to an operation performed by the user, the assignment section reassigns the component data, once assigned to each of the first coordinate values detected by the finger position detecting section, to another GUI component data.

It is preferable that when the second coordinate position is detected in accordance with an operation performed by the user, a displacement of each of the first coordinate positions is detected with respect to the detected second coordinate position, and a function corresponding to the displacement is executed.

It is preferable that the assignment section assigns no component data to one of the first coordinate values indicating the position of the fingertip corresponding to a specific finger type, and uniquely assigns the component data, different from each other between a plurality of types of appliances, to each of the other first coordinate values, each indicating the position of the fingertip corresponding to a remaining finger type, and the image generating section displays, for one of the plurality of types of appliances, which is currently being selected in response to an operation performed with the fingertip corresponding to the specific finger type with which the plurality of types of appliances can be selected, the GUI image in which each of the other first coordinate values, each indicating the position of the fingertip corresponding to the remaining finger type which is identified by a finger identifying section, is uniquely associated with the component data which is stored in the component storing section and which is assigned to the fingertip corresponding to the remaining finger type.

It is preferable that when the user contacts at least two points on the operation surface of the operation section, the contact position detecting section detects the second coordinate value indicating an initial contact position and further detects the second coordinate value indicating a second contact position, in response to the respective contacts performed by the user, the contact finger determining section determines the finger type the user uses to contact the operation surface, based on the second coordinate value, indicating the initial contact position, which is detected by the contact position detecting section and each of the first coordinate values to which the GUI component is uniquely assigned by the assignment section, and further specifies the GUI component currently designated by the user based on the second coordinate value, indicating the second contact position, which is detected by the contact position detecting section.

It is preferable that when the user traces a line between at least two points on the operation surface of the operation section, the contact position detecting section regularly detects the second coordinate value indicating a current contact position, in response to the respective contacts performed by the user, and the contact finger determining section determines the finger type the user uses to contact the operation surface, based on the second coordinate value regularly detected by the contact position detecting section and each of the first coordinate values to which the GUI component is uniquely assigned by the assignment section, and further specifies the GUI component currently designated by the user.

A second aspect of the present invention is directed to a display method used in the user interface system. The present invention comprises: a finger position detecting step of a group of first coordinate values, each indicating a current position of a fingertip of a user which is placed on an operation surface of an operation section, included in the user interface system, which receives an instruction inputted by the user; an assignment step of uniquely assigning component data, which is stored in a memory device included in the user interface system and which represents a GUI (Graphical User Interface) component, to each of the first coordinate values detected by the finger position detecting step; an image generating step of generating a GUI image representing a user interface in which the GUI component stored in the memory device is uniquely associated with each of the first coordinate values detected by the finger position detecting step, in accordance with an assignment performed by the assignment section; and a display controlling step of displaying the GUI image generated by the image generating step on a display screen included in the user interface system.

Effect of the Invention

As described in the respective aspects above, a predetermined function is assigned to the GUI component. Such a GUI component is displayed on the display screen as a portion of the GUI image. The displayed GUI component is associated with each of the fingertips of the user, i.e., the GUI component is assigned to each of the fingertips of the user. The GUI component is displayed in such a manner as described above, thereby making it possible to allow the user interface system according to each of the aspects to present at least a function which can be realized to the user, such that the user can visually recognize the function. Thus, the user interface system having an improved usability can be provided.

While the invention has been described in detail, the foregoing description is in all aspects illustrative and not restrictive. It is understood that numerous other modifications and variations can be devised without departing from the scope of the invention.

BRIEF DESCRIPTION OF THE DRAWINGS

FIG. 4 is a flowchart illustrating detailed process steps executed by a finger position detecting section 32 shown in FIG. 2.

FIG. 6A is a first schematic diagram illustrating a GUI image generated by an image generating section 36 shown in FIG. 2.

FIG. 10 is a flow chart illustrating a display process executed by the computer device 14 shown in FIG. 9.

FIG. 15 is a schematic diagram illustrating a third example of the multi-function assigning method used in the user interface system 1 or 11 shown in FIG. 1 or 8.

FIG. 17 is a schematic diagram illustrating an exemplary method of changing assignments of GUI components used in the user interface system 1 or 11 shown in FIG. 1 or 8.

FIG. 20 shows an exemplary display in which the button is always assigned to the specific finger when operating the GUI components.

FIG. 25B shows an exemplary display obtained when a function assigned to a remaining finger shown in FIG. 25A is executed.

Figure 1:
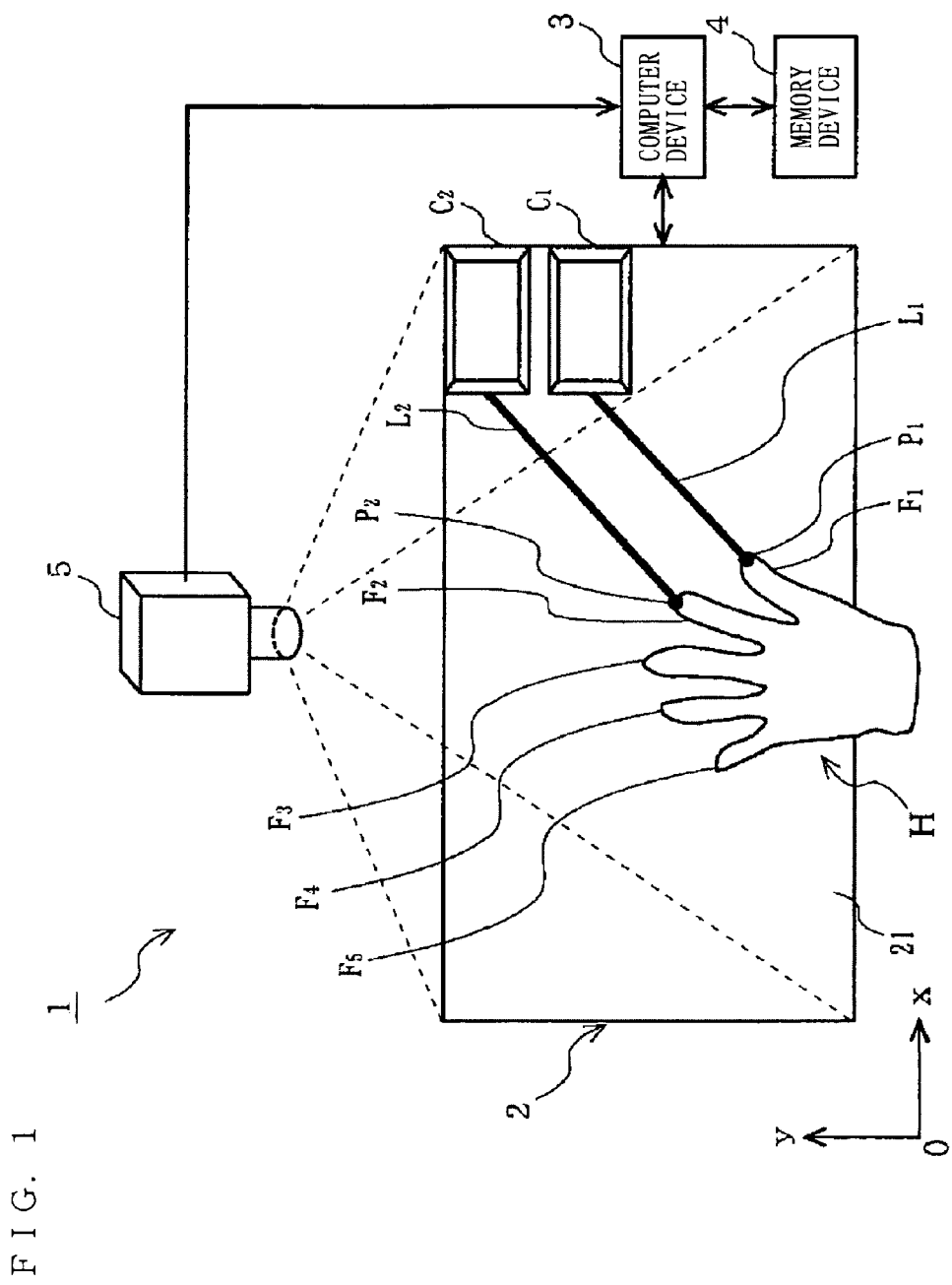
FIG. 1 is a schematic diagram illustrating a schematic configuration of a user interface system 1 according to an embodiment of the present invention.

DESCRIPTION OF THE REFERENCE CHARACTERS 1, 11 user interface system
2 touch screen
21 display screen
3, 14 computer device
31, 141 image receiving section
32, 142 finger position detecting section
33, 143 finger identifying section
34, 144 component assigning section
35, 145 image generating section
36, 146 display controlling section
37, 147 contact position detecting section
38, 148 contact finger determining section
39, 149 function executing section
4, 15 memory device
5, 13 image pickup device
12 pointing device
121 operation area

BEST MODE FOR CARRYING OUT THE INVENTION

Embodiment

FIG. 1 is a schematic diagram illustrating a schematic configuration of a user interface system 1 according to an embodiment of the present invention. For facilitating the understanding of the following description, FIG. 1 shows a two-dimensional coordinate system having an x axis and a y axis in an immediate neighborhood of a display device 21. In FIG. 1, the user interface system 1 mainly comprises a touch screen 2, a computer device, a memory device 4, and an image pickup device 5.

In the present embodiment, the touch screen 2 is an input device in which a user touches the display screen 21 having a predetermined size with his or her five fingers $F_1$ to $F_5$, for example, thereby allowing the user to instruct the computer device 3 connected to the touch screen 2 to execute a predetermined function.

Figure 2:
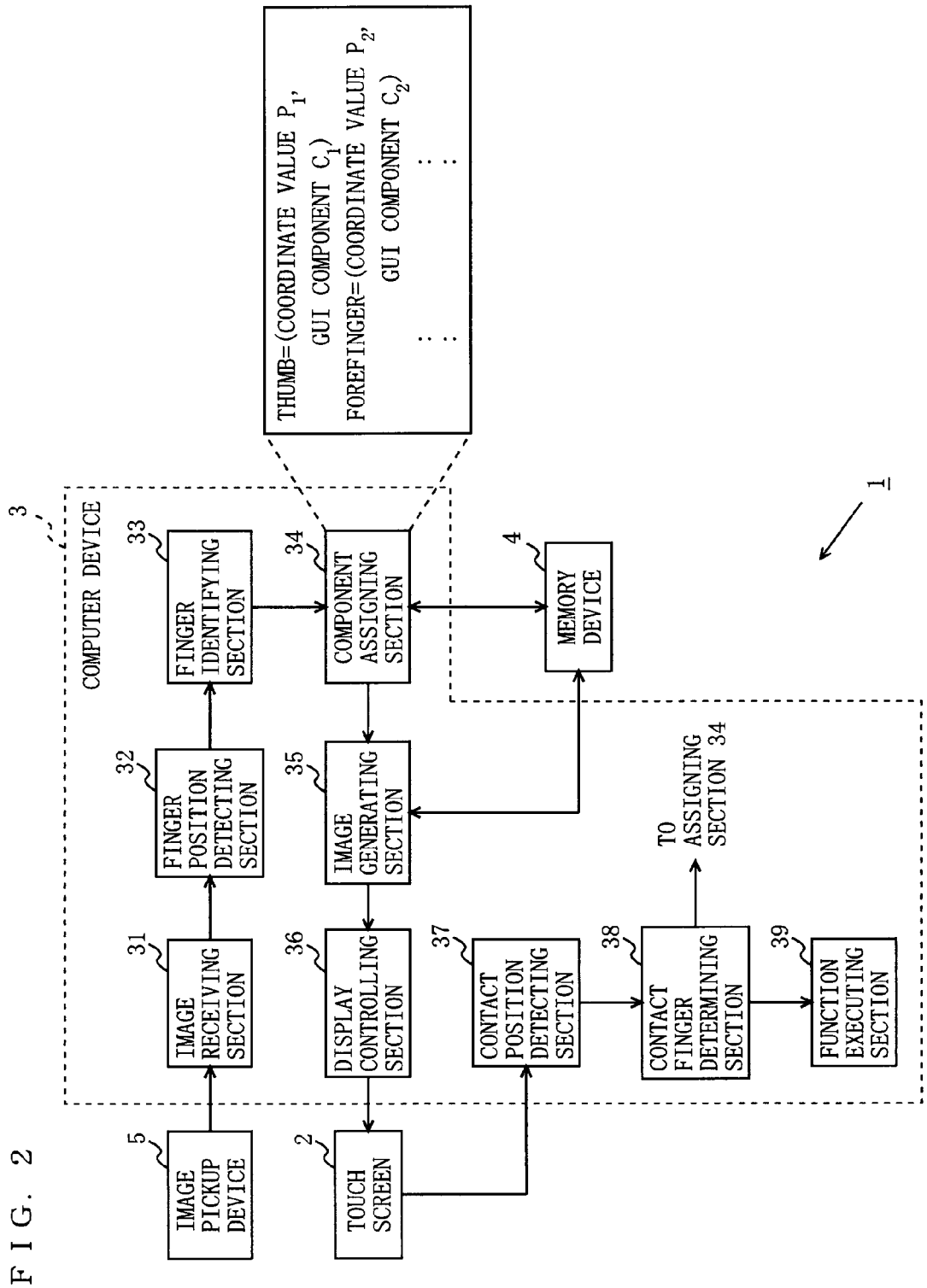
FIG. 2 is a schematic diagram illustrating a functional block configuration of a computer device 3 shown in FIG. 1.

The computer device 3 typically includes at least a processor and various memories, and operates in accordance with a computer program stored in a memory such as a ROM, for example. FIG. 2 is a schematic diagram illustrating a functional block configuration of the computer device 3. In FIG. 2, the computer device 3 executes the aforementioned computer program, thereby realizing functions of an image receiving section 31, a finger position detecting section 32, a finger identifying section 33, a component assigning section 34, an image generating section 35, and a display controlling section 36.

The description will continue referring back to FIG. 1. The memory device 4 stores GUI component data which is required for generating a GUI (Graphical User Interface) image to be displayed on the display screen 21. A predetermined function is assigned to the GUI component data, and the GUI component data is image data representing a GUI component such as an icon and a button, for example. The present embodiment conveniently assumes that the memory device 4 stores five pieces of image data representing five GUI components, respectively. Also, FIG. 1 exemplary shows two GUI components $C_1$ and $C_2$ displayed on the display screen 21.

The image pickup device 5 is set such that its angle of view covers at least a display area of the touch screen 2 (i.e., the display screen 21). The image pickup device 5, which is set in a manner described above, images an environment within a range of its angle of view in a predetermined time interval, and outputs the captured image to the computer device 3.

Figure 3:
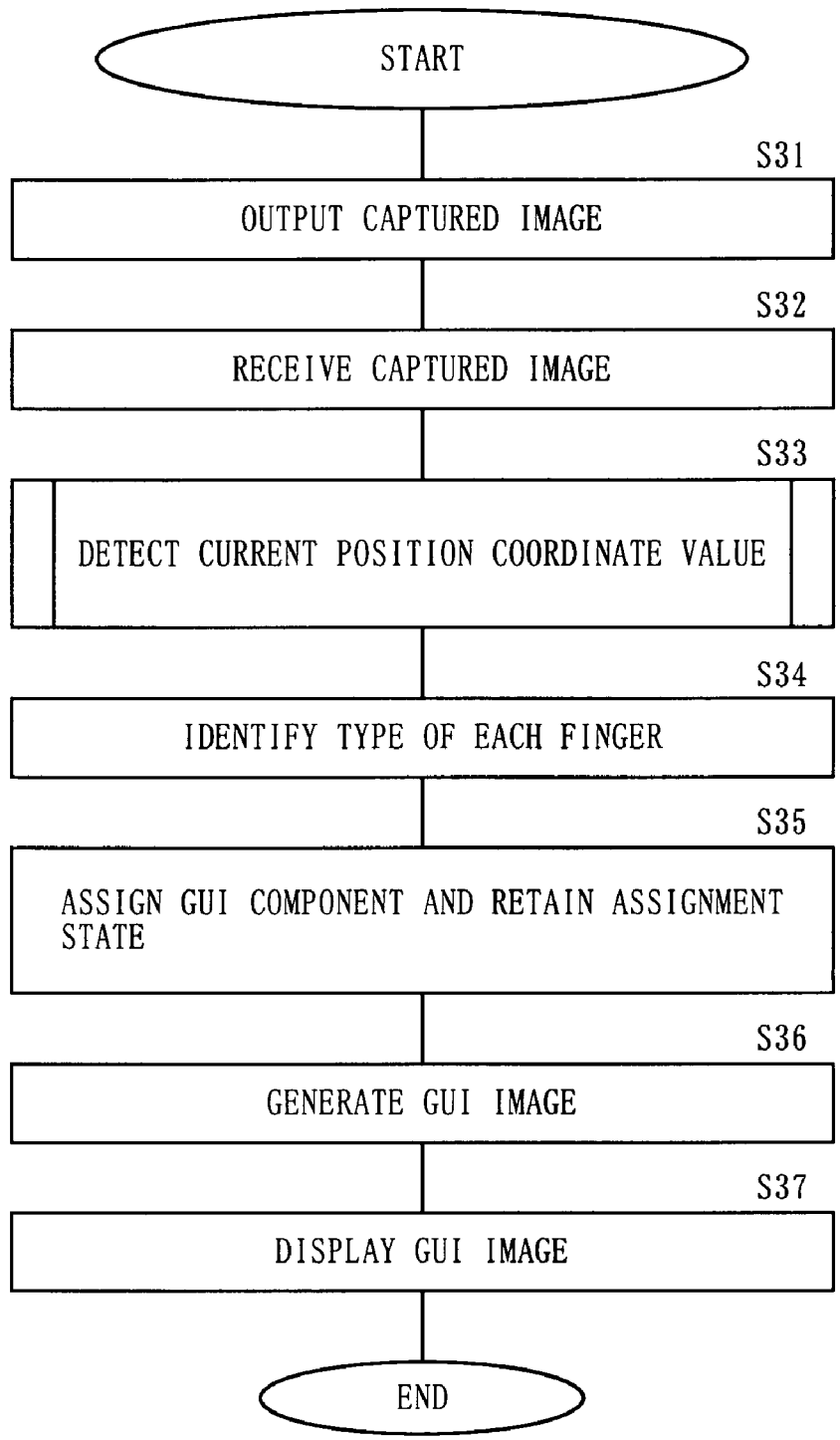
FIG. 3 is a flowchart illustrating a display process executed by the computer device 3 shown in FIG. 2.

Next, referring to FIG. 3, a display process executed by the user interface system 1 having the aforementioned configuration will be described. The user places his or her hand H (see FIG. 1) on the display screen 21. The image pickup device 5 images the environment within the range of its angle of view, and outputs the captured image to the computer device 3 (step S31). Note that as described above, in a case where the hand H is placed on the display screen 21, the hand H is shown in the captured image.

In the computer device 3, the image receiving section 31 receives the captured image outputted from the image pickup device 5 (step S32), and the finger position detecting section 32 detects a coordinate value indicating a position of each of the fingers $F_1$ to $F_5$ of the user, which are placed on the display screen 21 (hereinafter, referred to as a current position coordinate value), from the received image (step S33).

Referring to a flowchart shown in FIG. 4, a detailed process executed by the finger position detecting section shown in FIG. 2, that is, a detailed process of step S33 shown in FIG. 3 will be described. Firstly, the finger position detecting section 32 captures captured image data received by the image receiving section 31 into a frame memory which is not shown (step S41). Then, the finger position detecting section 32 executes a body area extracting process, thereby generating partial image data representing an area which shows the hand H of the user based on the captured image data stored in the frame memory (step S42). While the body area extracting process is executed, in the captured image stored in the frame memory, the area showing the hand H of the user and an area showing a background (mostly, showing the display screen 21) are distinguished from each other, thereby extracting only the area showing the hand H of the user.

As a method of distinguishing the hand H from the background, there is a background subtraction method, for example. In the background subtraction method, the finger position detecting section 32 preciously acquires, via the image receiving section 31, image data showing only the display screen 21 as background image data. The finger position detecting section 32 compares such background image data with the captured image data captured in step S41 for each pixel or block of pixels, thereby extracting an area different from a background portion in the captured image as the area of the hand H. According to the background subtraction method, the background of the hand H used when the image pickup device 5 images the environment does not need to be solid colored. Thus, as described in the present embodiment, it is effective when the display screen 21 of the touch screen 2 is used both as a display system and an operation system.

Subsequently to step S42 mentioned above, the finger position detecting section 32 executes a fingertip position detecting process, thereby detecting a group of current position coordinate values, each indicating a position of a fingertip of the user, by using the partial image data (step S43).

As a method of detecting the position of the fingertip as described above, the following three methods will be exemplified.

In a first method, a pattern matching is performed on the partial image data representing the hand H, thereby presuming the position of the fingertip. Specifically, based on a characteristic that a fingertip has a rounded shape, the pattern matching is performed in an area around the hand H included in the partial image data, by using a circular shaped template. By performing such a pattern matching, the finger position detecting section 32 acquires candidate points of tips of each of the fingers $F_1$ to $F_5$. Note that in the first method, the position of the fingertip may be mistakenly recognized. Therefore, the finger position detecting section 32 narrows down the candidate points to one point for each of the fingers $F_1$ to $F_5$, thereby acquiring the current position coordinate value indicating the position of the tip of each of the fingers $F_1$ to $F_5$.

In a second method, the user is prompted to previously place a mark on the tip of each of the fingers $F_1$ to $F_5$, when he or she uses the user interface system 1. A nail polish applied to nails is a typical example of the mark. Such a mark has a predetermined brightness or hue. Thus, the finger position detecting section 32 detects the brightness or hue of the mark in the partial image data, thereby acquiring the current position coordinate value indicating the position of the tip of each of the fingers $F_1$ to $F_5$. According to the second method described above, in a case where the image pickup device 5 is mounted in a place with little noise caused by external light, for example, it is effective because a change in the brightness or hue of the mark is reduced. Thus, it is possible to accurately acquire the current position coordinate value indicating the position of the tip of each of the fingers $F_1$ to $F_5$, and detect the acquired current position coordinate value.

Finally, in a third method, the finger position detecting section 32 performs a calibration, thereby tracking the tips of the fingers $F_1$ to $F_5$, which are placed at respective predetermined initial positions, in accordance with a movement of the hand H. More specifically, when the calibration is performed, the user places the tips of the fingers $F_1$ to $F_5$ at the respective positions (the initial positions) set by the display screen 21. The finger position detecting section 32 acquires an image captured by the image pickup device 5 in such a state, thereby detecting a brightness or hue of the image at the respective initial positions (i.e., the image of each of the tips of the fingers $F_1$ to $F_5$). Thereafter, each time the finger position detecting section 32 acquires the image captured by the image pickup device 5, the finger position detecting section 32 detects a position having substantially the same brightness and hue as those of the image of each of the fingers $F_1$ to $F_5$, which has been captured at a time of the calibration, thereby acquiring the position indicating the current position of the tip of each of the fingers $F_1$ to $F_5$ as the current position coordinate value.

This is the end of the description of the detailed process executed by the finger position detecting section 32, and the description will continue referring back to FIG. 3. When step S33 as mentioned above is finished, in the computer device 3, the finger identifying section 33 acquires the group of current position coordinate values acquired by the finger position detecting section 32, thereby identifying a thumb $F_1$, a forefinger $F_2$, a middle finger $F_3$, a ring finger $F_4$ and a little finger $F_5$, to which the current position coordinate values respectively correspond, i.e., identifying finger types to which the current position coordinate values respectively correspond (step S34).

Hereinafter, a detailed process executed by the finger identifying section 33 shown in FIG. 2, that is, a detailed process of step S34 shown in FIG. 3 will be described. As the process executed by the finger identifying section 33, the following two methods will be exemplified.

In a first method, the finger types are identified with each other by using a distance between fingers. Specifically, the finger identifying section 33 firstly selects, from among the five current position coordinate values acquired by the finger position detecting section 32, two pairs of the current position coordinate values, each pair corresponding to an endmost finger and a finger adjacent to the endmost finger. Then, the finger identifying section 33 calculates a distance between one of the pairs of the two current position coordinate values, and another distance between the other of the pairs of the two current position coordinate values, thereby determining one pair of the two current position coordinate values having a longer distance therebetween as those corresponding to the thumb $F_1$ and the forefinger $F_2$, and the other pair of the two current position coordinate values as those corresponding to the ring finger $F_4$ and the little finger $F_5$. As such, the finger identifying section 33 identifies the finger types to which the current position coordinate values respectively correspond.

Figure 5A:
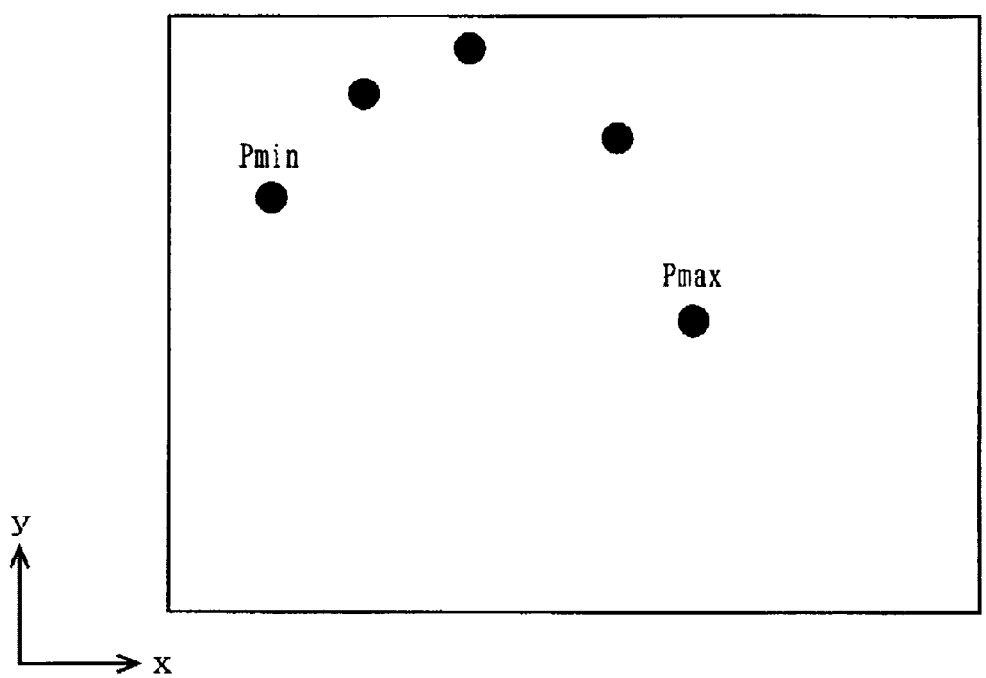
FIG. 5A is a first schematic diagram illustrating an exemplary process executed by a finger identifying section 33 shown in FIG. 2.
Figure 5B:
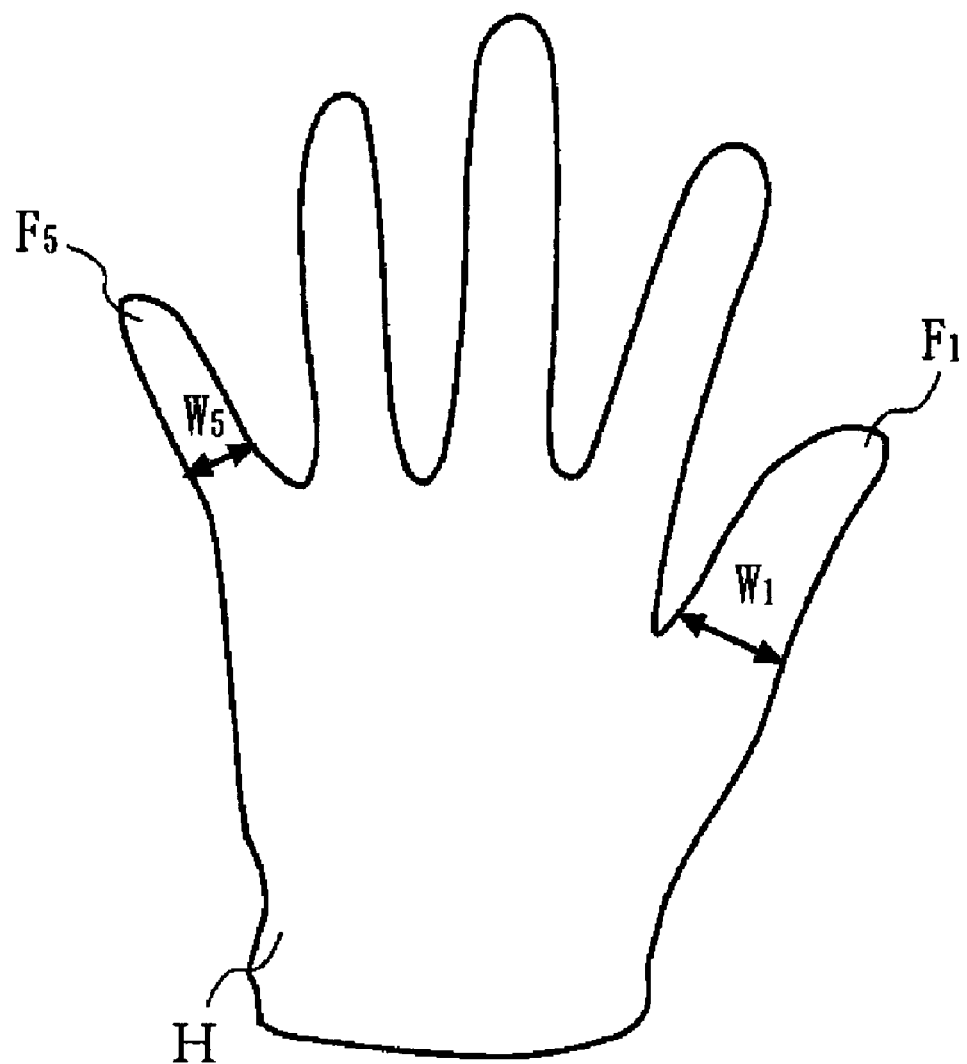
FIG. 5B is a second schematic diagram illustrating the exemplary process executed by the finger identifying section 33 shown in FIG. 2.

In a second method, the finger identifying section 33 may determine the thumb $F_1$, the forefinger $F_2$, the middle finger $F_3$, the ring finger $F_4$ and the little finger $F_5$ to which the current position coordinate values respectively correspond, in ascending or descending order of x coordinates of the five current position coordinate values acquired by the finger position detecting section 32. However, note that the hand H in this case must be placed in a predetermined orientation with respect to the display screen 21. Furthermore, there may be a case where it is unknown whether the hand H placed on the display screen 21 is a right hand or left hand. Therefore, the finger identifying section 33 selects, from among the five current position coordinate values acquired by the finger position detecting section 32, the coordinate values having the smallest x coordinate $P_{min}$ and the largest x coordinate $P_{max}$ which are shown in FIG. 5A. Also, in the partial image data generated by the finger position detecting section 32, the finger identifying section 33 detects thicknesses of the endmost fingers $W_1$ and $W_5$ shown in FIG. 5B, and determines one of the endmost fingers having a larger thickness as the thumb $F_1$, and the other one of the endmost fingers having a smaller thickness as the little finger $F_5$. Furthermore, when the x coordinate of the thumb $F_1$ is larger than that of the little finger $F_5$, the finger identifying section 33 identifies the current coordinate value having the current position coordinate value $P_{max}$ as the thumb $F_1$. As described above, when the current position coordinate value corresponding to the thumb $F_1$ is identified, the current position coordinate values of the other fingers $F_2$ to $F_5$ also can be identified accordingly. Note that an identification accuracy is improved if such a calculation is performed each time the captured image is acquired. However, the calculation may be performed at least once.

Whether the user uses the right or left hand may not be determined by using a method as described above. The user may use a not shown input device so as to designate a hand to be used.

Then, in the computer device 3, the component assigning section 34 receives an identification result, determined by the finger identifying section 33, that is the current position coordinate value of the thumb $F_1$, the current position coordinate value of the forefinger $F_2$, the current position coordinate value of the middle finger $F_3$, the current position coordinate value of the ring finger $F_4$, and the current position coordinate value of the little finger $F_5$, and uniquely assigns currently received five current position coordinate values to the five pieces of image data respectively representing the five GUI components, thereby retaining a current assignment state (step S35). FIG. 2 exemplarily shows that GUI components $C_1$ and $C_2$ are assigned to the current position coordinate values of the thumb $F_1$ and the forefinger $F_2$, respectively.

Thereafter, in the computer device 3, the image generating section 35 generates GUI image data representing a GUI image in a frame memory which is not shown (step S36). Specifically, in the GUI image, the five GUI components, each represented by the GUI component data, are superimposed on the display image at coordinate positions which do not overlap with each other. Furthermore, in the GUI image, the user can visually recognize an association between the current position coordinate value of the thumb $F_1$ retained by the component assigning section 34 and the GUI component $C_1$ assigned to the thumb $F_1$ by the component assigning section 34. Similarly to this, the user can also visually recognize an association between each of the current position coordinate values of the fingers $F_2$ to $F_5$ retained by the component assigning section 34 and the corresponding GUI component assigned to each of the current position coordinate values of the fingers $F_2$ to $F_5$.

Figure 6B:
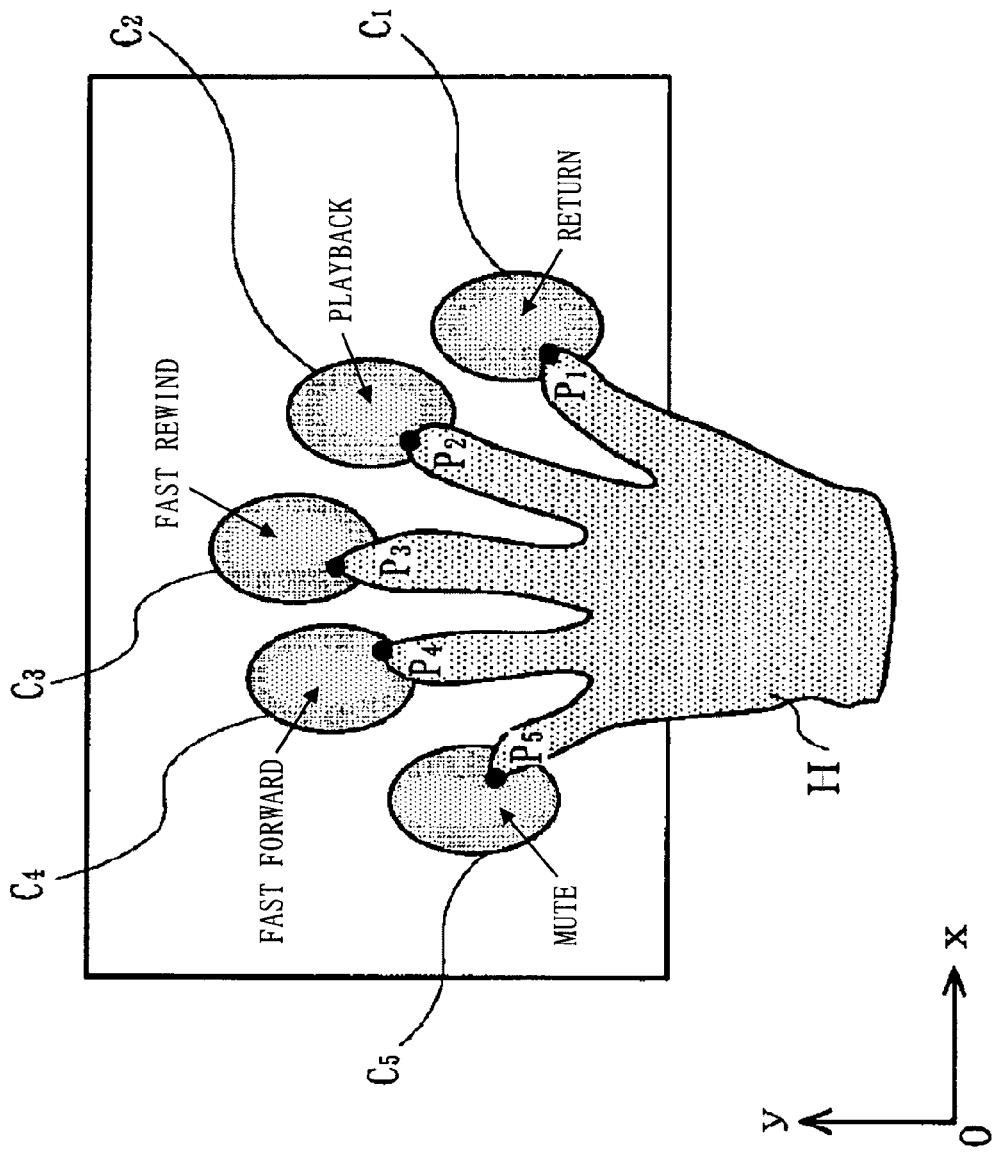
FIG. 6B is a second schematic diagram illustrating the GUI image generated by the image generating section 36 shown in FIG. 2.

Hereinafter, referring to FIGS. 6A to 6D, four GUI images rendered by the image generating section 35 will be exemplified. In FIG. 6A, the image generating section 35 draws a line $L_1$ between the current position coordinate value $P_1$ of the thumb $F_1$ and the GUI component $C_1$ assigned to the current position coordinate value $P_1$ corresponding to the thumb $F_1$, thereby associating the thumb $F_1$ and the GUI component $C_1$ with each other. Similarly, the current position coordinate values $P_2$ to $P_5$ of the other fingers $F_2$ to $F_5$ are connected to the GUI components $C_2$ to $C_5$ corresponding to the fingers $F_2$ to $F_5$ by lines $L_2$ to $L_5$, respectively. In this case, it is more preferable that patterns of the lines $L_1$ to $L_5$ (i.e., typically, a line type, a line color and a line thickness) are different from each other. The line type may be changed in accordance with the number of times the user designates a function specified by a GUI component to be executed.

In an example of FIG. 6A, the GUI components $C_1$ to $C_5$ are superimposed on a display image at an end of the display screen 21. Therefore, it is possible to secure an area for displaying a map or television image on a screen of an on-vehicle navigation system, for example. Furthermore, in order to secure visibility of the map or television image, it is preferable that a well-known blending process is performed on the GUI components $C_1$ to $C_5$ and the lines $L_1$ to $L_5$ to be superimposed on the map or television image, such that the user can visually recognize the GUI components $C_1$ to $C_5$ and the lines $L_1$ to $L_5$ in a translucent manner. Furthermore, the lines $L_1$ to $L_5$ are preferably drawn so as to circumvent an area in which the fingers $F_1$ and $F_5$ are placed on the display screen 21.

Figure 6C:
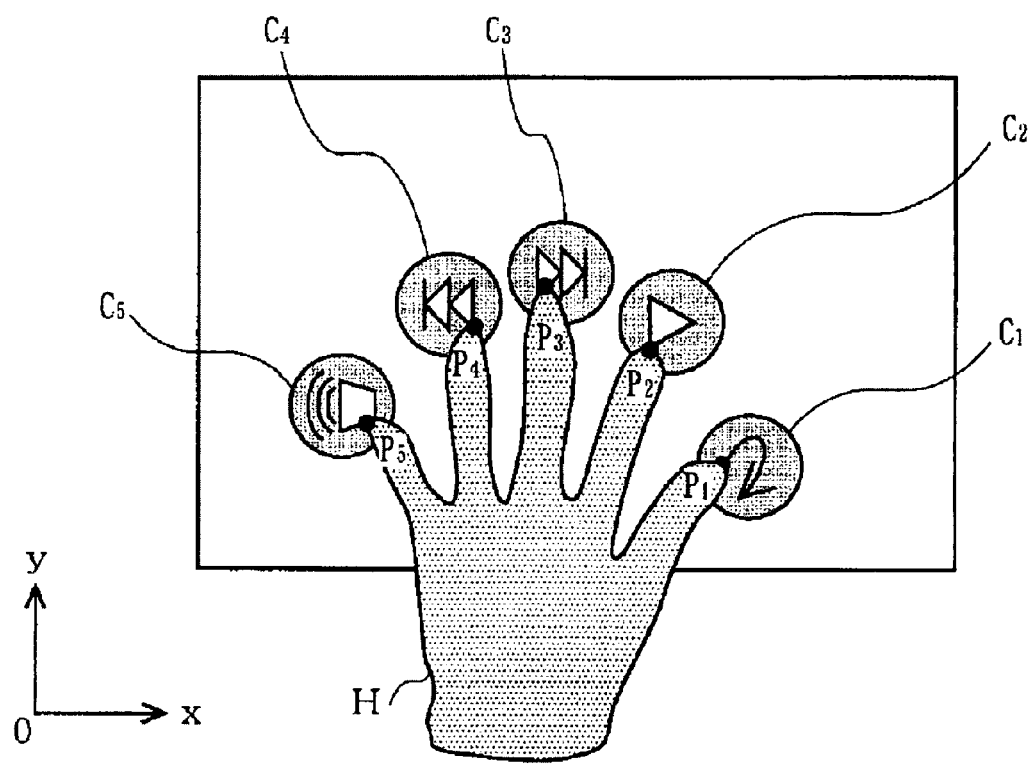
FIG. 6C is a third schematic diagram illustrating the GUI image generated by the image generating section 36 shown in FIG. 2.

Alternatively, as shown in FIGS. 6B and 6C, the image generating section 35 superimposes the GUI component $C_1$ corresponding to the thumb $F_1$ on the display image at a position designated by the current position coordinate value $P_1$ of the thumb $F_1$. Similarly, the GUI components $C_2$ to $C_5$ corresponding to the other fingers $F_2$ to $F_5$ are superimposed on the display image at positions designated by the current position coordinate values $P_2$ to $P_5$ of the other fingers $F_2$ to $F_5$, respectively. Note that as shown in FIG. 6C, in a case where each of the GUI components $C_1$ to $C_5$ includes a symbol representing a predetermined function, even if the GUI components $C_1$ to $C_5$ are hidden behind the fingers $F_1$ to $F_5$, respectively, the user can more easily recognize the function assigned to each of the GUI components, as compared to a case where the function is represented by characters. Thus, a time period required for the user to gaze at the display screen 21 can be shortened, thereby making it possible to allow the user interface system 1 to be more easily mounted for on-vehicle use which tends to have a problem of a screen gaze.

Figure 6D:
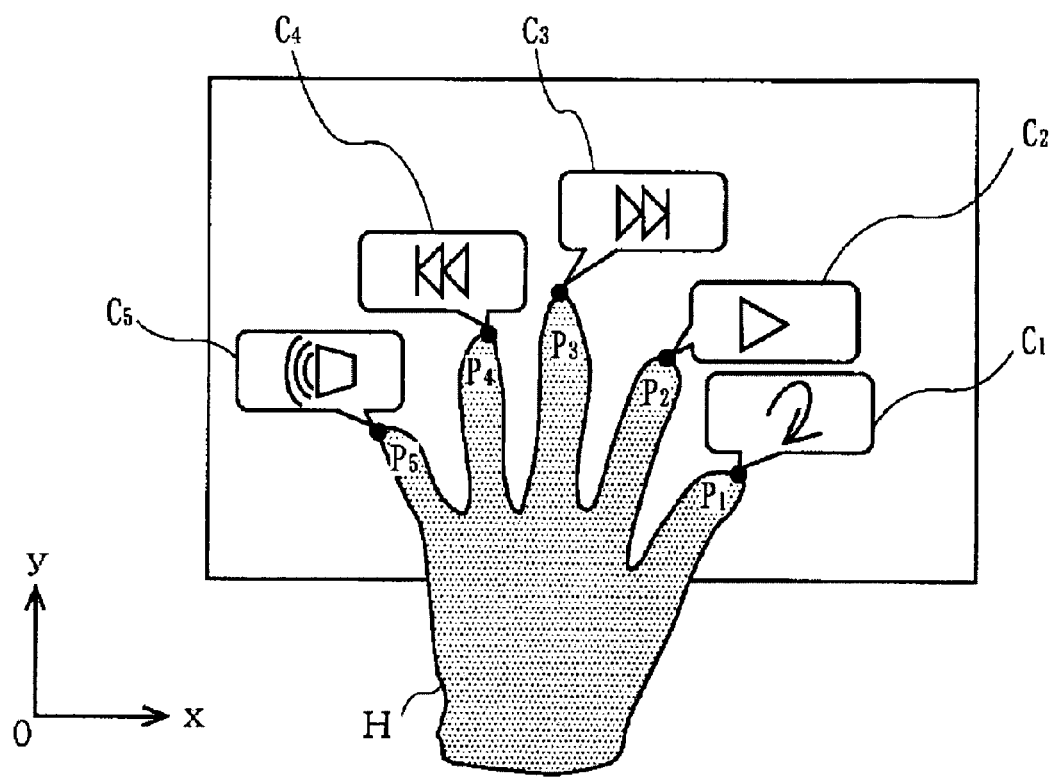
FIG. 6D is a fourth schematic diagram illustrating the GUI image generated by the image generating section 36 shown in FIG. 2.

Still alternatively, as shown in FIG. 6D, the image generating section 35 superimposes the GUI component $C_1$ corresponding to thumb $F_1$ on the display image in the vicinity of the current position coordinate value $P_1$ of the thumb $F_1$. Preferably, the GUI component $C_1$ is superimposed on the display image at a position away from a position specified by the current position coordinate value $P_1$ by a predetermined distance in the positive direction of a y axis. Thus, as shown in FIG. 6D, the GUI component $C_1$ is less likely to be hidden behind the thumb $F_1$, thereby allowing the user to visually recognize the GUI component $C_1$ more easily. Similarly, the GUI components $C_2$ to $C_5$ corresponding to the other fingers $F_2$ to $F_5$ are superimposed on the display image in the vicinities of the current position coordinate values $P_2$ to $P_5$ of the other fingers $F_2$ to $F_5$, respectively.

As described above, the finger identifying section 33 can identify whether the hand H currently used by the user is a right or left hand. Therefore, the component assigning section 34 may assign pieces of component data belonging to a predetermined first group to fingers of the left hand, respectively, and may assign another pieces of component data belonging to a second group different from the first group to fingers of the right hand, respectively.

Also, in accordance with a usage history or usage frequency of the GUI components $C_1$ to $C_5$, or in accordance with a group of coordinate values of the fingers, the image generating section 35 may change a size, color, shape or transparency of the GUI components $C_1$ to $C_5$, or may further change a font used for the GUI components $C_1$ to $C_5$. Any GUI component having a low usage frequency may not be superimposed on the display image, or may be superimposed on the display image so as to be blinkingly displayed.

This is the end of the description of the detailed process executed by the image generating section 35, and the description will continue referring back to FIG. 3. After step S36 as mentioned above is finished, in the computer device 3, the display controlling section 36 displays the GUI image (see FIG. 1, and FIGS. 6A to 6D) on the display screen 21 of the touch screen 2 in accordance with the GUI image data currently generated in the frame memory (step S37). Note that in the GUI image exemplified in FIG. 1, the current position coordinate value $P_1$ indicating the position of the thumb $F_1$ is connected to the GUI component $C_1$ by the line $L_1$, and the current position coordinate value $P_2$ indicating the position of the forefinger $F_2$ is connected to the GUI component $C_2$ by the line $L_2$. However, due to space limitation, the current position coordinate values, lines and GUI components are not shown for the other fingers $F_3$ to $F_5$.

The aforementioned processes described with reference to FIGS. 1 and 2 are executed at a predetermined time interval. By executing the aforementioned processes, the image pickup device 5 regularly outputs the captured image to the computer device 3 at the aforementioned time interval. Also, in the computer device 3, a series of processes executed by the image receiving section 31, the finger position detecting section 32, the finger identifying section 33, the component assigning section 34, the image generating section 35, and the display controlling section 36 are regularly executed at the aforementioned time interval. Therefore, while the fingers $F_1$ to $F_5$ are moving on the display screen 21, the current position coordinate value of each of the fingers $F_1$ to $F_5$ changes over time in accordance with a movement thereof. As a result, in the GUI image shown in FIG. 6A, with reference to a superimposed position of a GUI component, the line connecting the GUI component to the current position coordinate value of each of the fingers also expands/contracts and rotates over time in accordance with the movement thereof. In other words, it appears to the user as if his or her fingers are connected to the GUI components by the lines, respectively. Thus, even if the fingers $F_1$ to $F_5$ of the user are moved, the line connecting to each of the fingers expands/contracts and rotates, as described above, thereby allowing him or her to easily identify the GUI component assigned to each of the fingers.

In the GUI images shown in FIGS. 6B and 6C, the user feels as if the GUI component itself is displaced over time in accordance with the movement of each of the fingers. Thus, even if the fingers $F_1$ to $F_5$ of the user are moved, the GUI component connecting to each of the fingers is displaced in accordance with the movement thereof, thereby allowing him or her to easily identify the GUI component assigned to each of the fingers.

As described above, a process executed until the GUI image is displayed in the user interface system 1 is described. Next, another process for executing, in the user interface system 1, the function assigned to each of the GUI components displayed on the display screen 21 will be described. In order to execute such a process, the computer device 3 operates in accordance with the computer program stored in an internal memory, thereby further realizing functions of the contact position detecting section 37, the contact finger determining section 38, and the function executing section 39, which are shown in FIG. 2.

Figure 7:
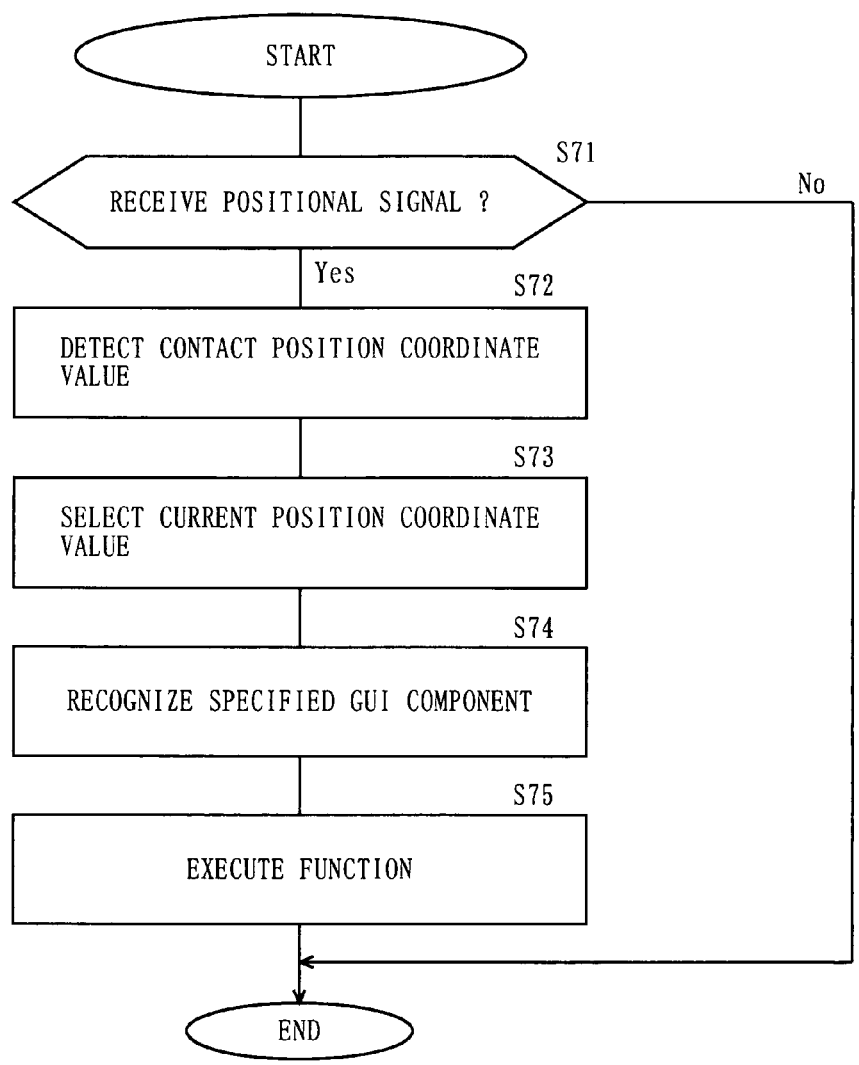
FIG. 7 is a flowchart illustrating a function executing process executed by the computer device 3 shown in FIG. 2.

Next, referring to FIG. 7, a function executing process executed by the user interface system 1 shown in FIG. 2 will be described. The user contacts the display screen 21 with any of the fingers to which a specific function has been assigned by the aforementioned display process, and applies a force to the display screen 21. Then, the touch screen 2 applies, to the computer device 3, a signal which can specify a position currently in contact with the user (hereinafter, referred to as a positional signal).

In the computer device 3, upon receiving the positional signal from the touch screen 2 (step S71), the contact position detecting section 37 detects a coordinate value indicating a position, on the display screen 21, which is currently in contact with the user (hereinafter, referred to as a contact coordinate value) (step S72).

The contact finger determining section 38 checks the current assignment state retained by the component assigning section 34, thereby selecting a current position coordinate value which substantially coincides with the contact coordinate value detected by the contact position detecting section 37 (step S73). Furthermore, the contact finger determining section 38 specifies a GUI component assigned to the selected current position coordinate value (step S74).

The function executing section 39 executes a function assigned to the GUI component recognized by the contact finger determining section 38 (step S75).

As described above, in the user interface system 1, the component assigning section 34 retains a current position of each of the fingers, and a GUI component assigned to each of the fingers. Furthermore, based on the positional signal transmitted from the touch screen 2 and the assignment state retained by the component assigning section 34, the contact finger determining section 38 determines one of the fingers which is currently being used by the user, and further specifies a function he or she wishes to currently execute. According to the user interface system 1 described above, unlike the conventional art, the user does not need to bring his or her finger onto a GUI component disposed at a predetermined location. Thus, it becomes possible to provide the user interface system 1 which the user is able to quickly operate.

The above embodiment describes that the user interface system 1 comprises the touch screen 2. However, the same function as that of the touch screen 2 can be realized by combining a touch panel, touch pad or touch tracer with a projector. In this case, the projector projects the GUI image on the touch panel, touch pad or touch tracer.

(Variant)

In the embodiment described above, the user interface system 1 comprises the touch screen 2. As a result, the display screen 21 functions both as an operation area of the user and as a display area of the GUI image. However, the operation area of the user and the display area of the GUI image may be positioned away from each other. Hereinafter, referring to FIG. 8, a user interface system 11, in which the operation area of the user and the display area of the GUI image are separately provided at positions away from each other, will be described.

Figure 8:
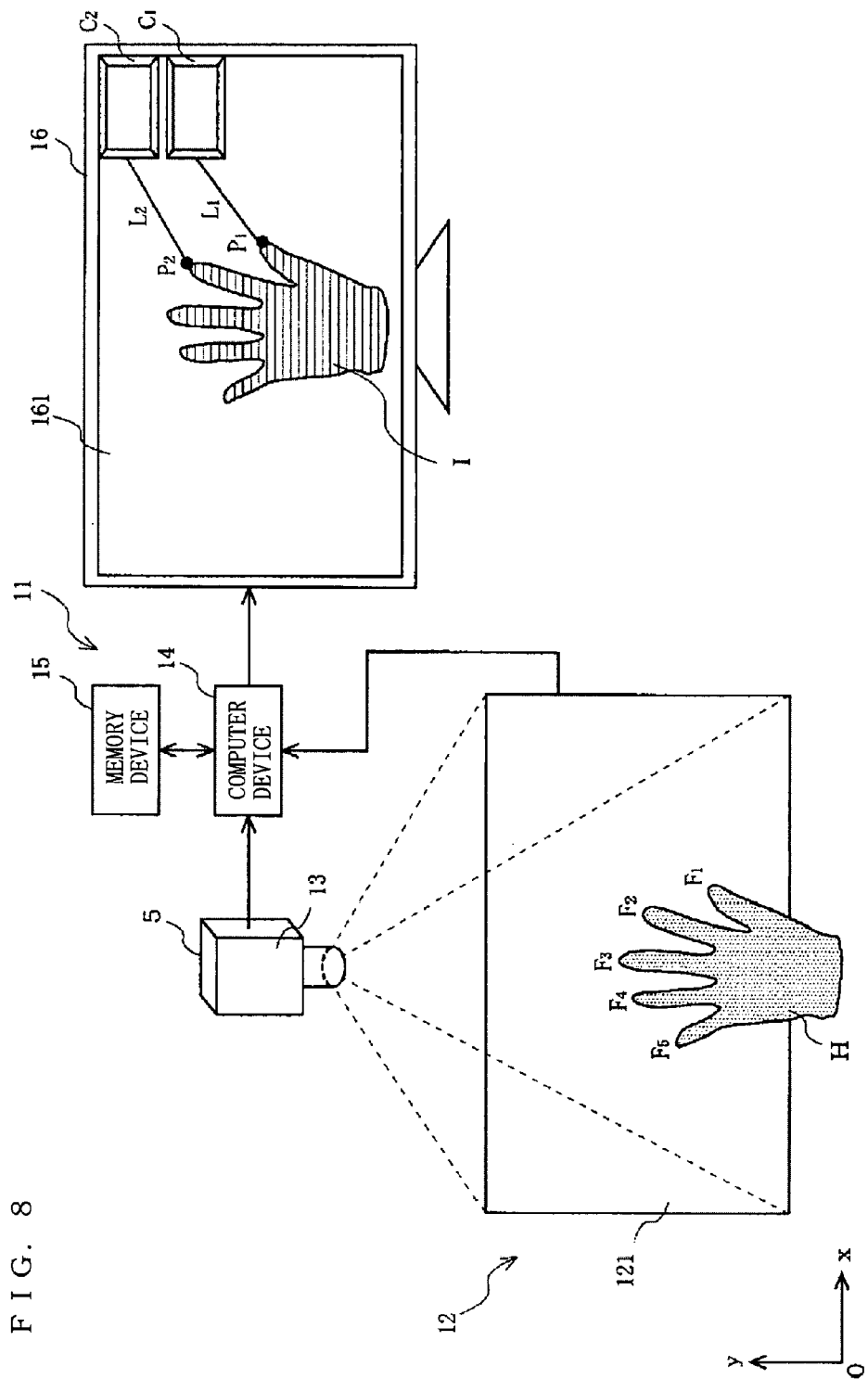
FIG. 8 is a schematic diagram illustrating a schematic configuration of a user interface system 11 according to a variant of the present invention.

In FIG. 8, the user interface system 11 mainly comprises a pointing device 12, an image pickup device 13, a computer device 14, a memory device 15, and a display device 16.

In order to instruct the computer device 3 to execute a predetermined function, the pointing device 12 designates an area 121 in which the user can move his or her fingers (hereinafter, referred to as an operation area), and outputs a contact position signal indicating a position contacted by the user with his or her fingers. As the pointing device 12, a pressure sensitive type device or an optical type device, such as the touch panel, touch pad or touch tracer, may be used. Alternatively, as the pointing device 12, an ultrasonic type device may also be used.

The image pickup device 13 is set such that its angle of view covers at least the operation area 121. The image pickup device 13, which is set in a manner described above, images an environment within a range of its angle of view in a predetermined time interval, and outputs the captured image to the computer device 14.

Figure 9:
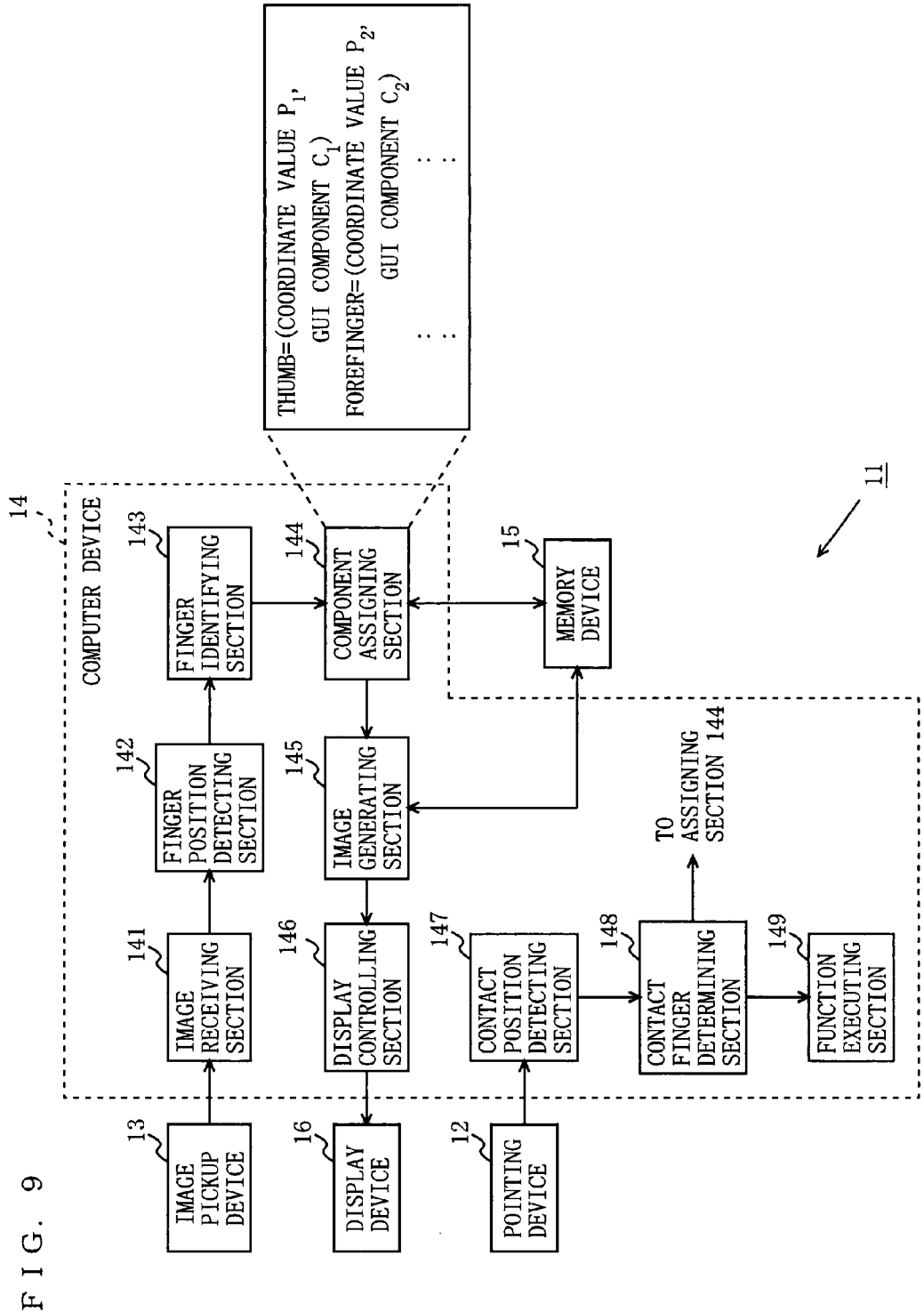
FIG. 9 is a schematic diagram illustrating a functional block configuration of a computer device 14 shown in FIG. 8.

The computer device 14 typically includes at least a processor and various memories, and operates in accordance with a computer program stored in a memory such as a ROM, for example. FIG. 9 is a schematic diagram illustrating a functional block configuration of the computer device 14. In FIG. 9, the computer device 14 executes the aforementioned computer program, thereby realizing functions of an image receiving section 141, a finger position detecting section 142, a finger identifying section 143, a component assigning section 144, an image generating section 145, a display controlling section 146, a contact position detecting section 147, a contact finger determining section 148, and a function executing section 149.

The memory device 15 stores the same GUI component data as that stored in the memory device 4 described above.

In the present variant, unlike the aforementioned touch screen in which the user uses his or her fingers so as to specify the GUI component, the display device 16 may include at least a function for displaying the GUI image generated by the computer device 14. Such a display device 16 is typically a liquid crystal display, a CRT display, an organic EL display, an apofocus display or a projector.

Next, referring to FIG. 10, a display process executed by the user interface system 11 having the aforementioned configuration will be described. The user places his or her hand H on the operation area 121. The image pickup device 13 outputs a captured image showing the hand H to the computer device 14 (step S101).

In the computer device 14, the image receiving section 141 receives the captured image (step S102), and the finger position detecting section 142 detects, based on the received captured image, a coordinate value indicating a position, on the operation area 121, of each of the fingers $F_1$ to $F_5$ of the user (hereinafter, referred to as a current position coordinate value), and further detects coordinate values determining a shape (contour) of the hand H (hereinafter, referred to as a contour coordinate value group) (step S103).

Specifically, as a first method, the finger position detecting section 142 generates partial image data similar to that of the aforementioned embodiment by means of a brightness threshold value method. That is, in the captured image, the finger position detecting section 142 distinguishes a background (the operation area 121) from the hand H of the user according to a brightness value of each of pixels. Therefore, it is preferable that the operation area 121 is colored solid black or another color similar to black, and a surface of the operation area 121 is frosted. Furthermore, a threshold value is previously set so as to be larger than the brightness value of any of the pixels showing the background of the captured image. Thus, the finger position detecting section 142 compares the brightness level of each of the pixels of the captured image with the threshold value, thereby making it possible to generate the partial image data representing an area of the hand H. Furthermore, in order to stably generate the partial image data even under a circumstance where the surrounding area is dark, the image pickup device 13 irradiates visible light or far-red light to the range of its angle of view, thereby allowing the hand H to be shown so as to have the brightness level larger than the threshold value.

Alternatively, as a second method, the finger position detecting section 142 generates the partial image data by means of a chroma-key processing method. The chroma-key processing is often used for television broadcasting. In the chroma-key processing, based on a background of blue which is a color most easily distinguishable from a color of human skin, a portion whose color is other than blue can be extracted, thereby generating image data of the portion extracted in such a manner described above. In this case, the operation area 121 is colored blue, and the image pickup device 13 irradiates visible light to the range of its angle of view, for example, so as to clearly show the hand H and the background.

Next, subsequent to step S103 mentioned above, the finger identifying section 143 identifies the finger types to which a group of current position coordinate values correspond, respectively, in a similar manner to that of the embodiment described above (step S104).

The component assigning section 144 receives an identification result from the finger identifying section 143, and uniquely assigns currently received five current position coordinate values to the five pieces of GUI component data stored in the memory device 15, thereby retaining a current assignment state (step S105).

Figure 11A:
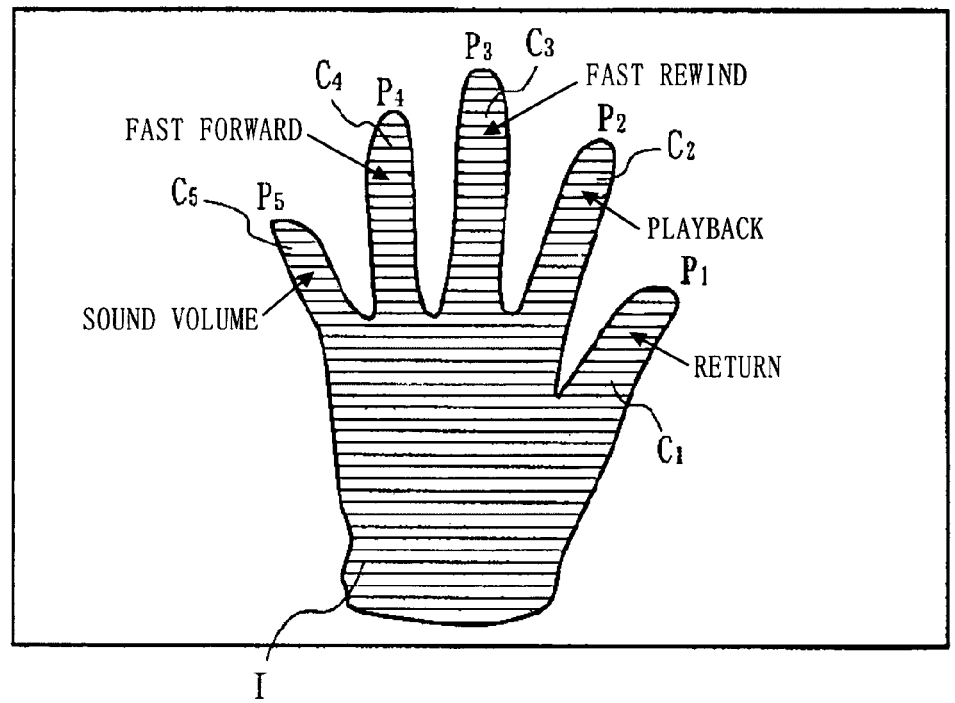
FIG. 11A is a first schematic diagram illustrating the GUI image generated by an image generating section 146 shown in FIG. 9.
Figure 11B:
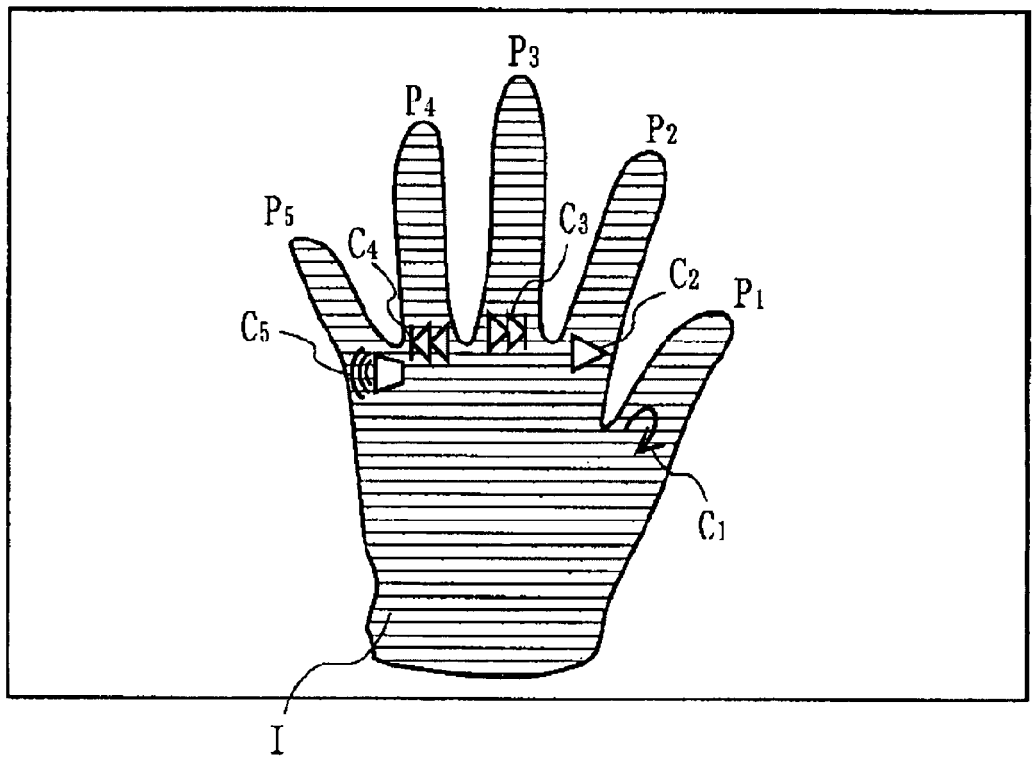
FIG. 11B is a second schematic diagram illustrating the GUI image generated by the image generating section 146 shown in FIG. 9.

Thereafter, in the computer device 14, the image generating section 155 generates the GUI image data representing the GUI image in a frame memory which is not shown (step S106). The present variant is different from the embodiment mentioned above in that an object I representing the shape of the hand is superimposed on the display image in the area designated by the aforementioned contour coordinate value group as shown in FIG. 8, FIG. 11A and FIG. 11B.

Then, in the computer device 14, the display controlling section 146 displays the GUI image on the display screen 161 of the display device 16 in accordance with the GUI image data currently generated in the frame memory (step S107).

A process of steps S101 to S107 described above is executed at a predetermined time interval. Thus, the user interface system 11 according to the present variant functions in a similar manner to the embodiment described above, thereby resulting in a technical effect that allows the user to easily recognize the GUI component assigned to each of the fingers.

Figure 12:
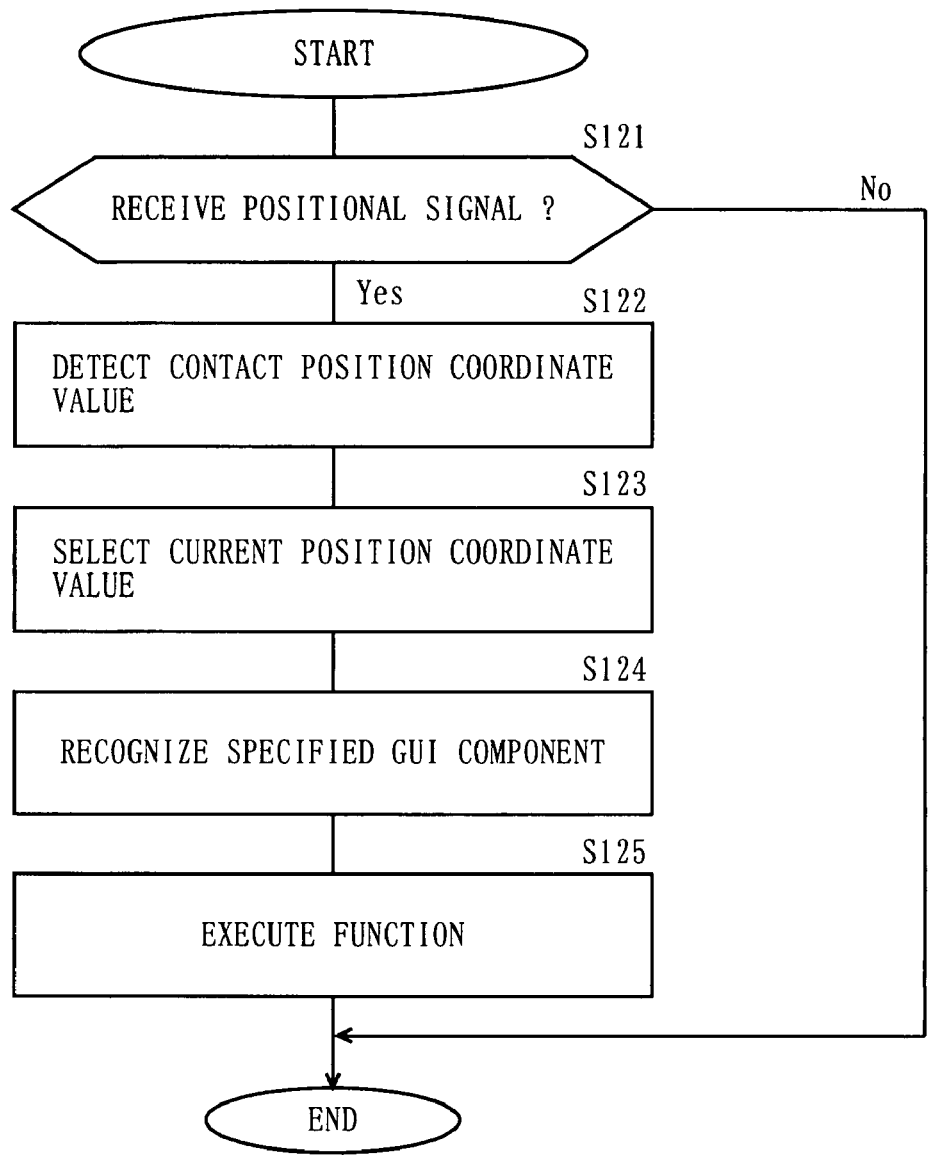
FIG. 12 is a flowchart illustrating a function executing process executed by the computer device 14 shown in FIG. 9.

Next, referring to FIG. 12, a function executing process executed by the user interface system 11 shown in FIG. 8 will be described. The user contacts the operation area 121 with any of the fingers to which a specific function has been assigned by the aforementioned display process, and applies a force to the operation area 121. Then, the pointing device 12 applies to the computer device 14a positional signal which can specify a position currently in contact with the user.

In the computer device 14, upon receiving the positional signal from the pointing device 12 (step S121), the contact position detecting section 147 detects a coordinate value indicating the position, on the operation area 121, which is currently in contact with the user (hereinafter, referred to as a contact coordinate value) (step S122).

Next, the contact finger determining section 148 checks the current assignment state retained by the component assigning section 144, thereby selecting the current position coordinate value which substantially coincides with the contact coordinate value converted by the contact position detecting section 147 (step S123). Furthermore, the contact finger determining section 148 recognizes the GUI component assigned to the selected current position coordinate value (step S124).

The function executing section 149 executes a function assigned to the GUI component recognized by the contact finger determining section 148 (step S125).

As described above, the user interface system 11 according to the present variant functions in a similar manner to the embodiment described above. As a result, it becomes possible to provide the user interface system 11 which the user is able to quickly operate.

Figure 13:
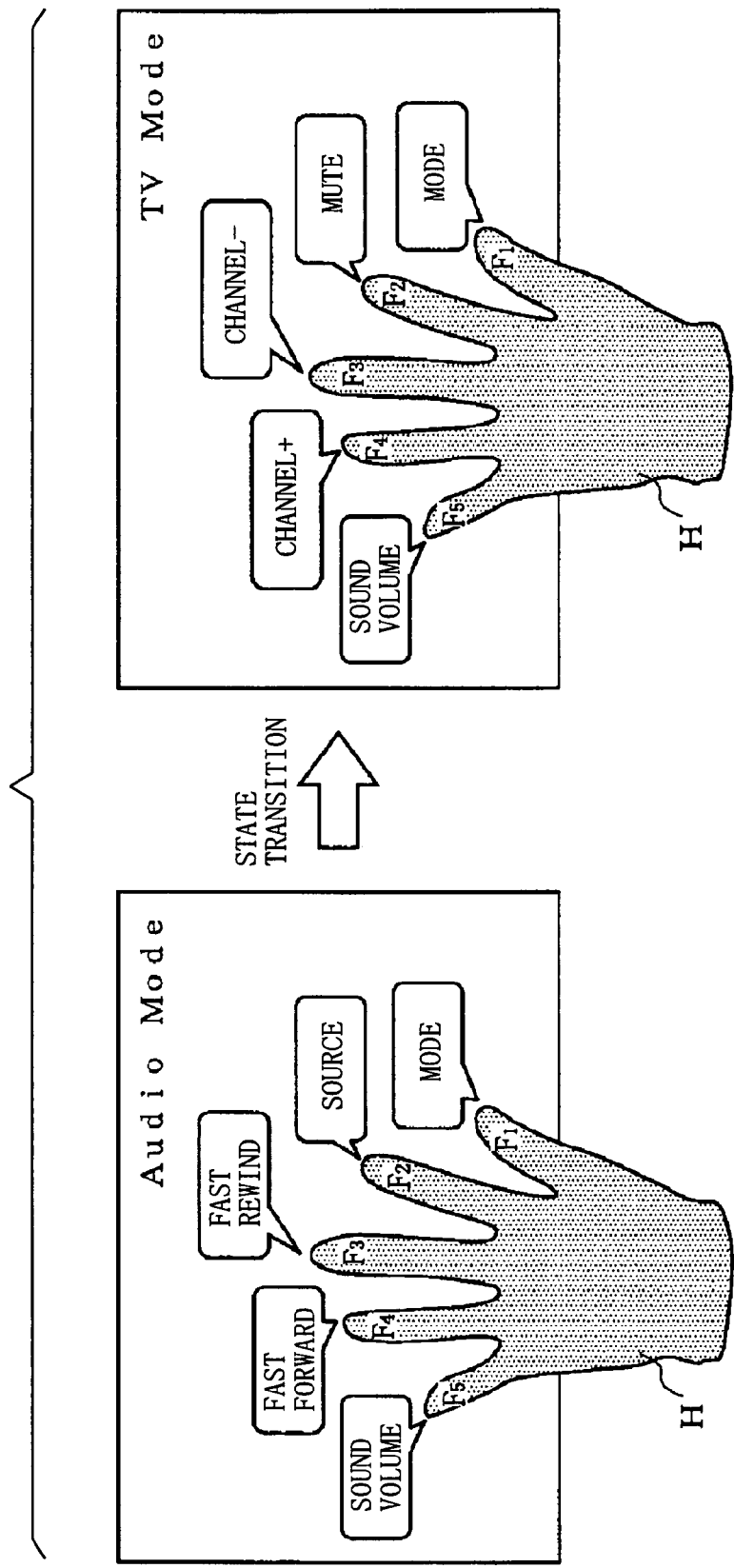
FIG. 13 is a schematic diagram illustrating a first example of a multi-function assigning method used in the user interface system 1 or 11 shown in FIG. 1 or 8.

Note that in the aforementioned embodiment and variant, the GUI component is uniquely assigned to each of the fingers. Therefore, only a maximum of five GUI components can be used in the user interface systems 1 and 11. For solving this problem, as shown in FIG. 13, a state transition function is assigned to a predetermined finger (the thumb $F_1$ in FIG. 13), and when the state transition function detects that the user operates the display screen 21 or the operation area 121 by using the predetermined finger, the component assigning sections 34 or 144 changes the GUI component assigned to each of the remaining fingers. Therefore, it becomes possible to assign a maximum of eight GUI components in total to the fingers before and after assigning the state transition function to the predetermined finger.

Alternatively, a great number of GUI components can be assigned to the fingers as follows. Specifically, the display screen 21 or the operation area 121 is divided into a plurality of partial areas by means of a predetermined method. For example, in FIG. 14, the display screen 21 or the operation area 121 is divided into four rectangular areas. A plurality of appliances are uniquely assigned to the rectangular areas. Note that one appliance may be assigned to a plurality of areas. The component assigning section 34 or 144 changes the GUI component assigned to each of the fingers for each of the areas (for each of the appliances).

Figure 14:
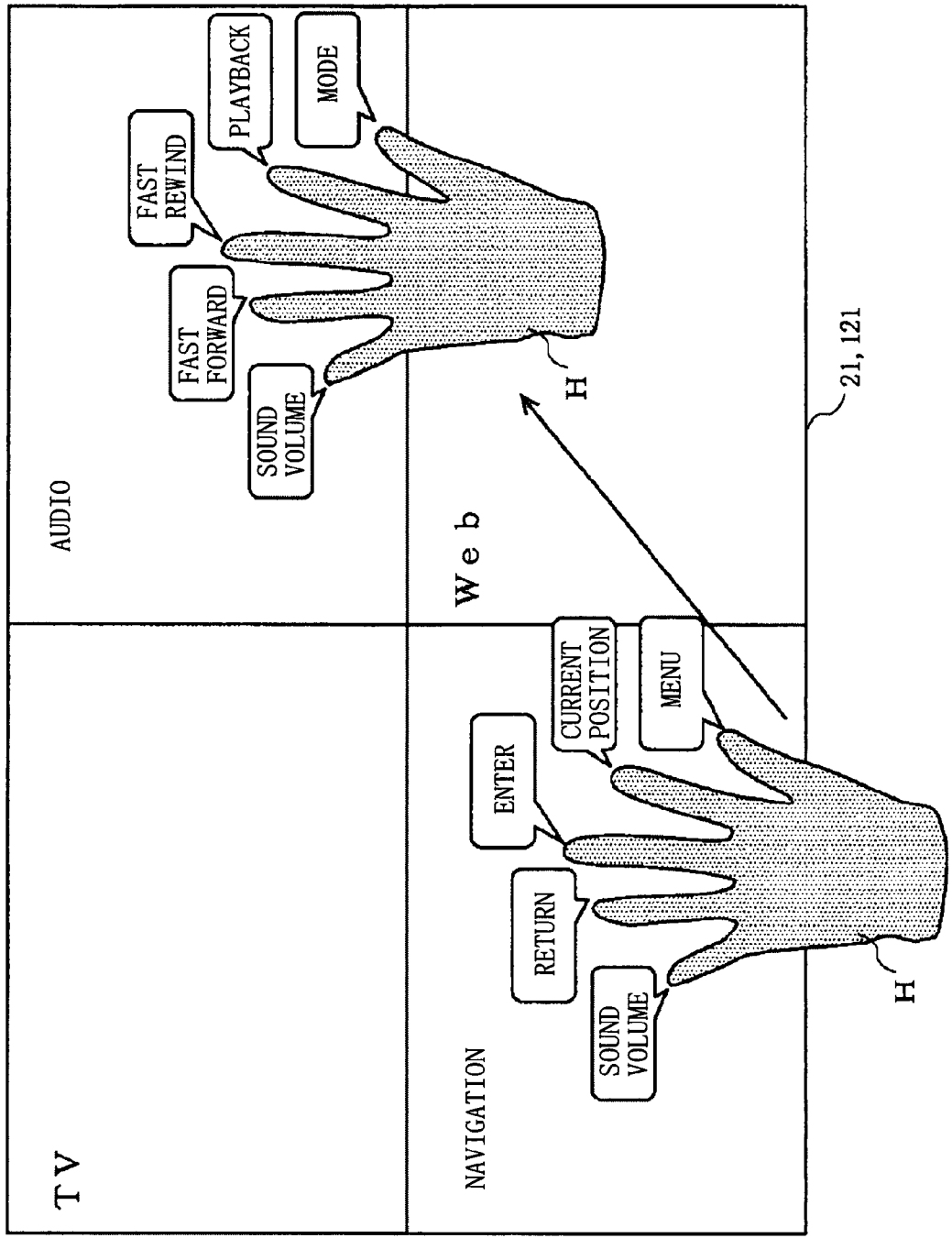
FIG. 14 is a schematic diagram illustrating a second example of the multi-function assigning method used in the user interface system 1 or 11 shown in FIG. 1 or 8.

As shown in FIG. 14, a detailed example of this is a case where one area is assigned to a navigation system, and the component assigning section 34 or 144 assigns a GUI component indicating a menu display to the thumb $F_1$ for the one area, and uniquely assigns another GUI component used for the navigation system to each of the other fingers $F_2$ to $F_5$.

Also, as shown in FIG. 14, another area is assigned to an audio appliance, and the component assigning section 34 or 144 assigns a GUI component indicating a mode change to the thumb $F_1$ for the said another area, and uniquely assigns another GUI component used for the audio appliance to each of the other fingers $F_2$ to $F_5$.

Under such a condition, the contact finger determining section 38 or 148 reads the assignment state retained by the component assigning section 34 or 144, and determines an area of the display screen 21 or the operation area 121 which is operated by a finger, and a type of the finger used therefor, based on the current position coordinate value, thereby specifying an appliance to be currently controlled and a function to be executed by the appliance, based on a determination result.

Still alternatively, a great number of GUI components can be assigned to the fingers as follows. Specifically, as shown in FIG. 15, the component assigning section 34 or 144 assigns no GUI component to a predetermined finger (the thumb $F_1$ in FIG. 15), and uniquely assigns the GUI component to each of the remaining fingers. In an example of FIG. 15, for the audio appliance, the GUI component $C_1$ used for a replay function, the GUI component $C_2$ used for a rewind function, the GUI component $C_3$ used for a forward function, and the GUI component $C_4$ used for a volume adjustment function are assigned to the forefinger $F_2$, the middle finger $F_3$, the ring finger $F_4$, and the little finger $F_5$, respectively. Similarly, for other appliances, the GUI component is assigned to each of the fingers other than the thumb. Furthermore, in order to select an appliance to be controlled, GUI components $SC_1$ to $SC_4$ used for designating the appliance are superimposed on the display image at predetermined positions.

Furthermore, based on a contact position of the predetermined finger (the thumb $F_1$), the image generating section 35 or 145 determines any of the GUI components $SC_1$ to $SC_4$ used for selecting an appliance, and generates a GUI image on which the GUI components $C_1$ to $C_4$, respectively assigned to the fingers for the appliance, are superimposed.

After the GUI image is displayed, the contact finger determining section 38 or 148 reads the assignment state retained by the component assigning section 34 or 144, and determines, an area of the display screen 21 or the operation area 121 which is operated by a finger, and a type of the finger used therefor, based on the current position coordinate value, thereby specifying an appliance to be currently controlled and a function to be executed by the appliance, based on a determination result.

Figure 16:
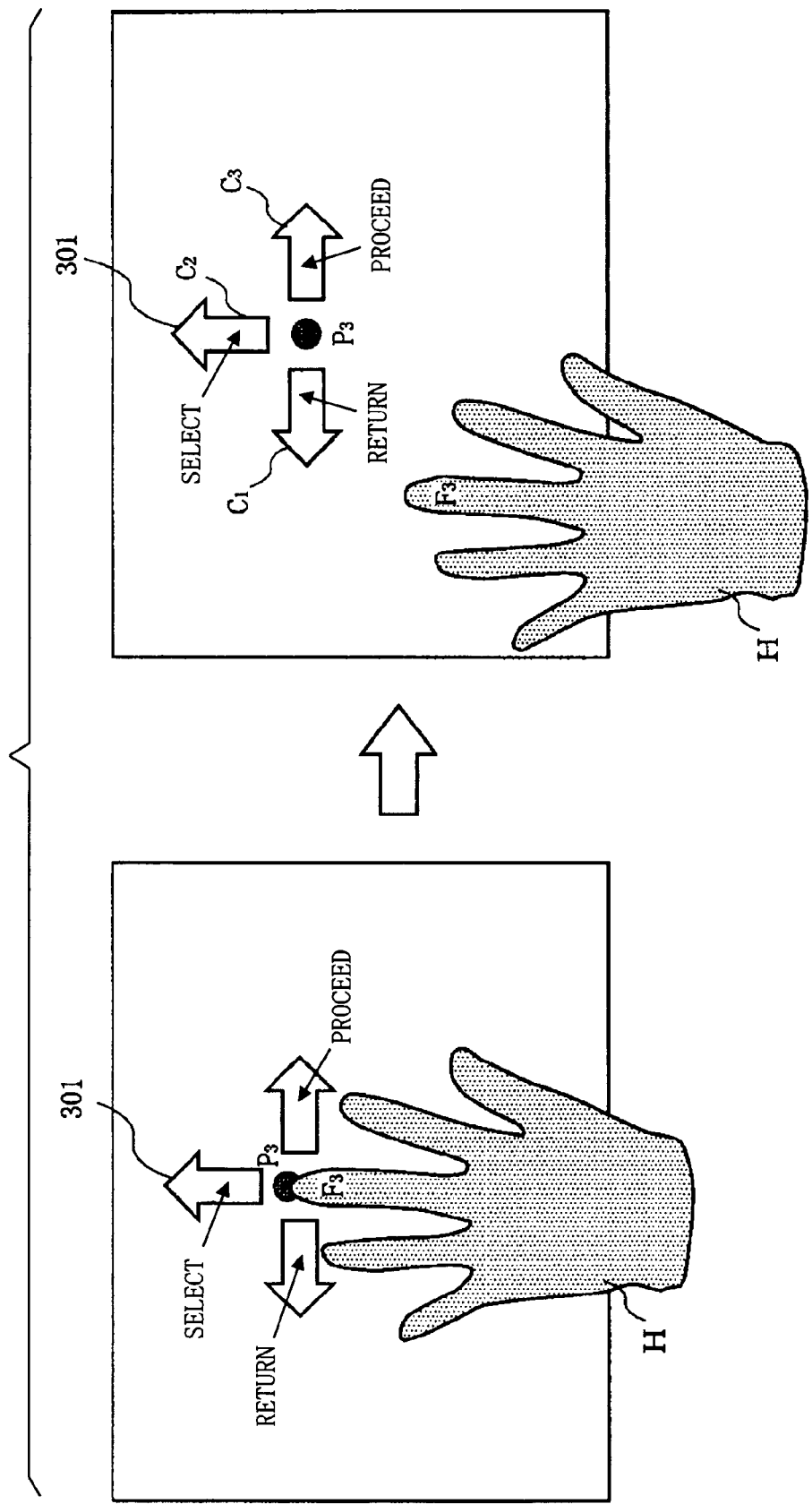
FIG. 16 is a schematic diagram illustrating a fourth example of the multi-function assigning method used in the user interface system 1 or 11 shown in FIG. 1 or 8.

Still alternatively, a great number of GUI components can be assigned to the fingers as follows. Specifically, as shown in FIG. 16, the component assigning section 34 or 144 assigns a predetermined number of the GUI components $C_1$ to $C_3$ (three GUI components in FIG. 16) to a predetermined finger (the middle finger $F_3$ in FIG. 16). Furthermore, the image generating section 35 or 145 generates a GUI image on which the assigned GUI components $C_1$ to $C_3$ are superimposed at positions which are in the vicinity of a current position coordinate value $P_3$ of the middle finger $F_3$, and which do not overlap with each other. More preferably, the GUI image generating section 35 or 145 also superimposes a mark indicating a reference position (i.e., a position indicated by the coordinate value $P_3$) at the current position coordinate value $P_3$ on the display image.

After such a GUI image is displayed, the user firstly contacts the reference position $P_3$ on the display screen 21 or the operation area 121. Thereafter, the user contacts any of the GUI components $C_1$ to $C_3$ having a function the user wishes to currently designate. As a result, the touch screen 2 or the pointing device 12 firstly transmits a first positional signal which can specify the reference position $P_3$, and then receives a second positional signal which can specify a position included in an area on which the currently designated GUI component $C_1$, $C_2$ or $C_3$ is superimposed. The contact finger determining section 38 or 148 retains a receiving time of the first positional signal (hereafter, referred to as a reference time), and specifies a finger type (the middle finger $F_3$ in this case) in response to receiving the first positional signal. Then, upon receiving the second positional signal, the finger contact determining section 38 or 148 specifies, based on a time difference between the receiving time of the second positional signal and the reference time, a continuity between an initial finger contact and a second finger contact, thereby specifying the GUI component designated by the user, i.e., a function to be currently executed, based on the reference position $P_3$ specified by the first positional signal and a position specified by the second positional signal.

Note that when a designation method described above is used, the user must designate at least two points on the display screen 21 or the operation area 121. In other words, the user must designate a direction with respect to the reference point $P_3$ in this case. Therefore, each of the GUI components $C_1$ to $C_3$ is preferably represented by an arrow indicating the direction with respect to the reference point $P_3$.

Furthermore, in the above description, the three GUI components $C_1$ to $C_3$ are assigned to one finger $F_3$. However, the present invention is not limited thereto. One or more GUI components may be assigned to each of the plurality of fingers.

Still furthermore, in the above description, the user designates the two points. However, the present invention is not limited thereto. The user may designate a GUI component displayed on the display screen 21 or the operation area 121 by tracing the GUI component with his or her finger. Such a designation method is suitable for a case where an optimum value is set within a certain range such as a volume adjustment.

Still furthermore, in the aforementioned embodiment or variant, the component assigning section 34 or 144 may change a GUI component once assigned to each of the fingers to another GUI component. In the component assigning section 34 or 144, it is assumed that a GUI component to be assigned to each of the fingers is set by default. Also, the user interface system 1 or 11 includes an assignment change mode. In the assignment change mode, as exemplary shown in FIG. 17, the GUI image generating section 35 or 145 generates a GUI image on which changeable GUI components $C_1$ to $C_{10}$ are superimposed at positions which do not overlap with each other. The user recognizes the displayed GUI image, and considers a function he or she wishes to assign to each of the fingers. Thereafter, on the display screen 21 or the operation area 121, the user specifies one of the GUI components to which the function is to be assigned by using a corresponding finger. Accordingly, the component assigning section 34 or 144 updates the assignment state.

Figure 18A:
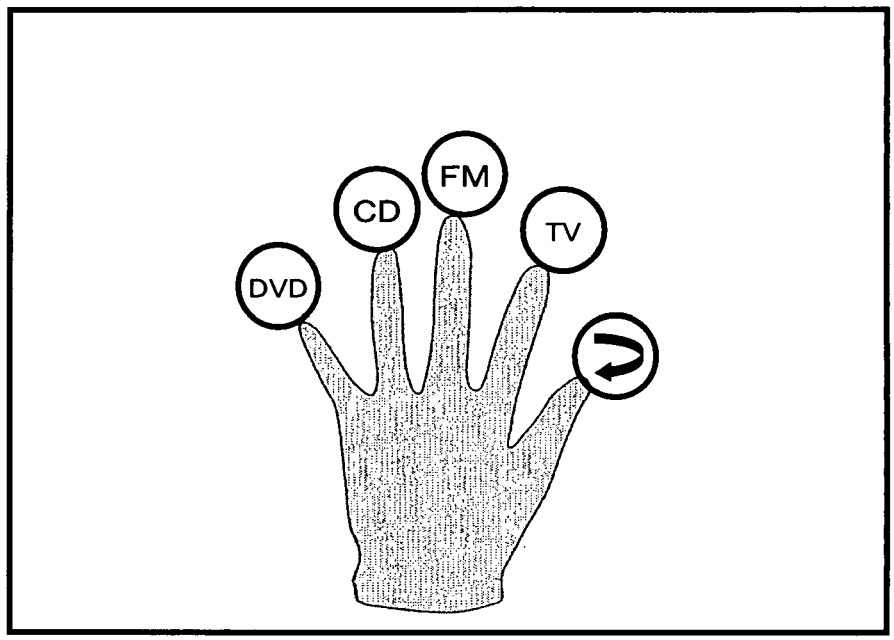
FIG. 18A shows an exemplary display obtained when the GUI components representing main menus used in the user interface system 1 or 11 shown in FIG. 1 or 8 are assigned to fingers.
Figure 18B:
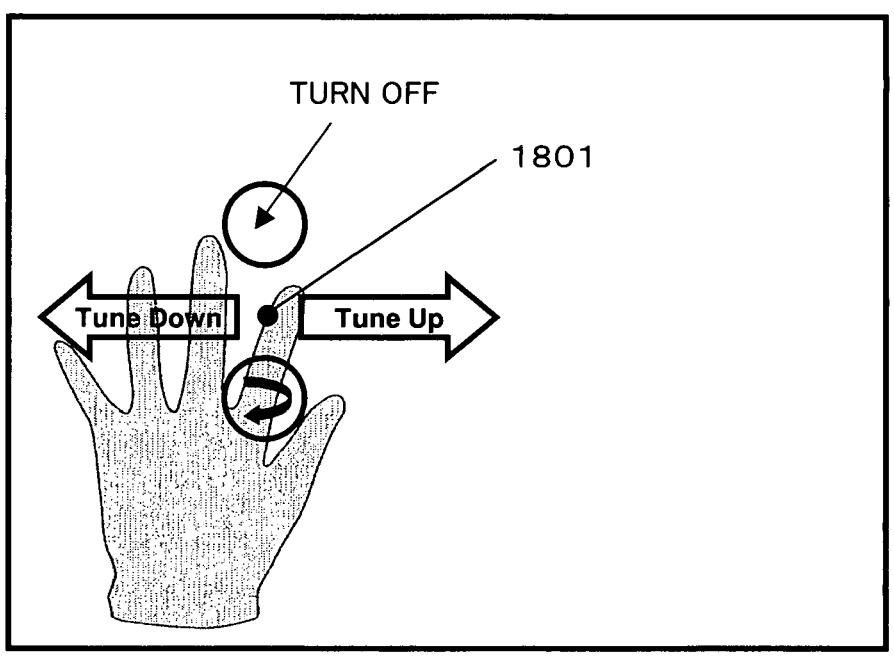
FIG. 18B shows an exemplary display of submenus to be displayed by selecting a function from the main menus shown in FIG. 18A.

Furthermore, in response to the first positional signal indicating the contact position of the finger, main menus as shown in FIG. 18A are displayed, thereby determining a function to be executed from the displayed main menus. Then, the user interface system displays submenus of the function determined by the first positional signal as shown in FIG. 18B. In this case, each of the submenus may be displayed centering on the contact position of a finger 1801 indicated by the first positional signal. As such, by means of a hierarchically structured assignment, a great number of GUI components can be assigned to the fingers. Note that FIG. 18A and FIG. 18B show a case where a FM button is selected by the first positional signal.

The GUI components to be displayed after being selected by the first positional signal are not limited to be represented by icons, buttons or arrows. The aforementioned GUI components may be represented by slider bars.

Figure 19A:
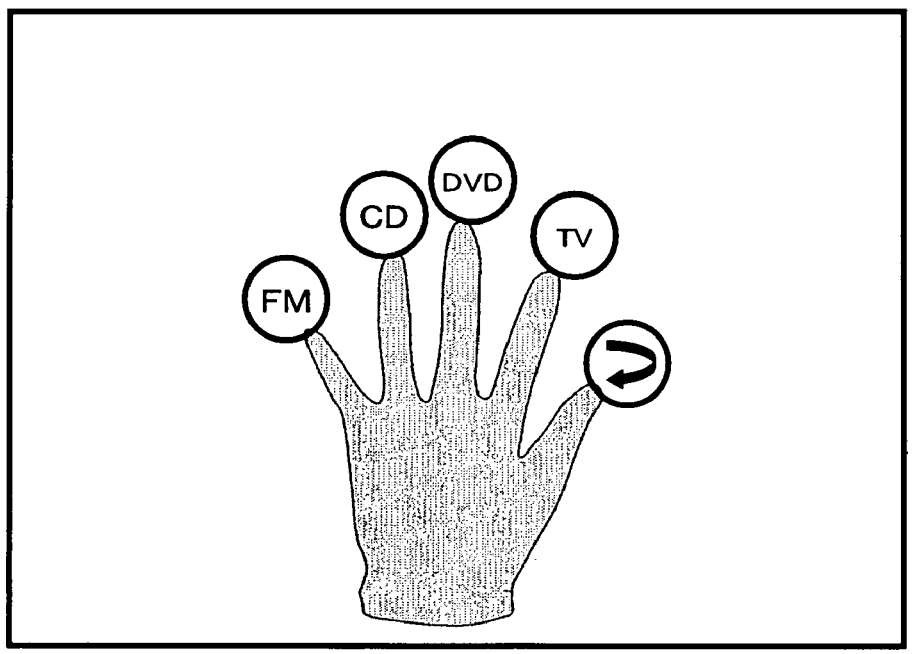
FIG. 19A shows an exemplary display obtained when the GUI components used in the user interface system 1 or 8 shown in FIG. 1 or 8 are assigned to the fingers.
Figure 19B:
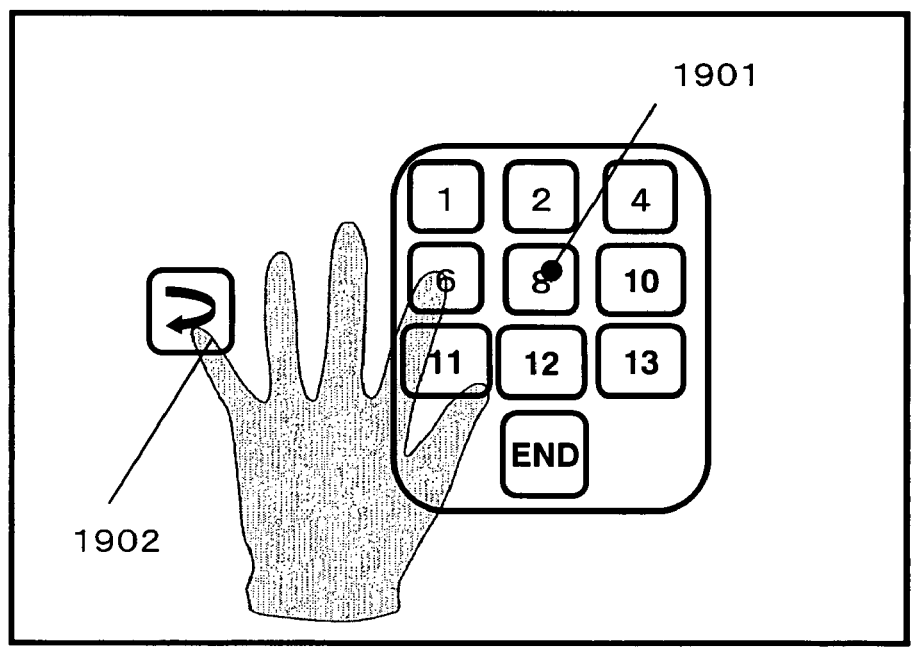
FIG. 19B shows an exemplary case where the assignments of the GUI components used in the user interface system 1 or 8 shown in FIG. 1 or 8 are changed, and a button is always assigned to a specific finger.

In a state where a screen as shown in FIG. 19A is displayed, an exemplary display, obtained when a TV function is executed in response to the first positional signal, is shown. When a TV button is pressed down, channel buttons are displayed as shown in FIG. 19B. In this case, the contact position indicated by the first positional signal is a position 1901.

As shown in FIG. 19B, without losing an association between each of the fingers and the GUI component assigned thereto, a finger 1902 remotest from menus which are fixedly displayed is detected, thereby displaying a GUI component, such as cancel or return, which is operable to escape the function which has already been executed, so as to be associated only with the finger. As such, even if the hand is moved, the specific GUI component will always be displayed in accordance with a movement of the finger, thereby making it possible to allow the user to assuredly operate the user interface system.

Furthermore, referring to FIG. 20, an exemplary case where the GUI components are operated while retaining only an association between a specific finger and one of the GUI components assigned thereto, will be described.

FIG. 20 shows a case where the user uses a software keyboard so as to input a character. Here, a correction button is associated only with a finger 2001. Thus, when the user operates the GUI component with fingers other than the finger 2001, an interface displays the software keyboard in response to the fingers other than the finger 2001. The correction button will always be assigned to the finger 2001, thereby making it possible to allow the user to execute a correction function even if he or she contacts the pointing device 12 at any position with the finger 2001. Note that a function associated with a specific finger is not limited to the correction function. It is desirable to add a function which is frequently needed by the user.

Figure 21:
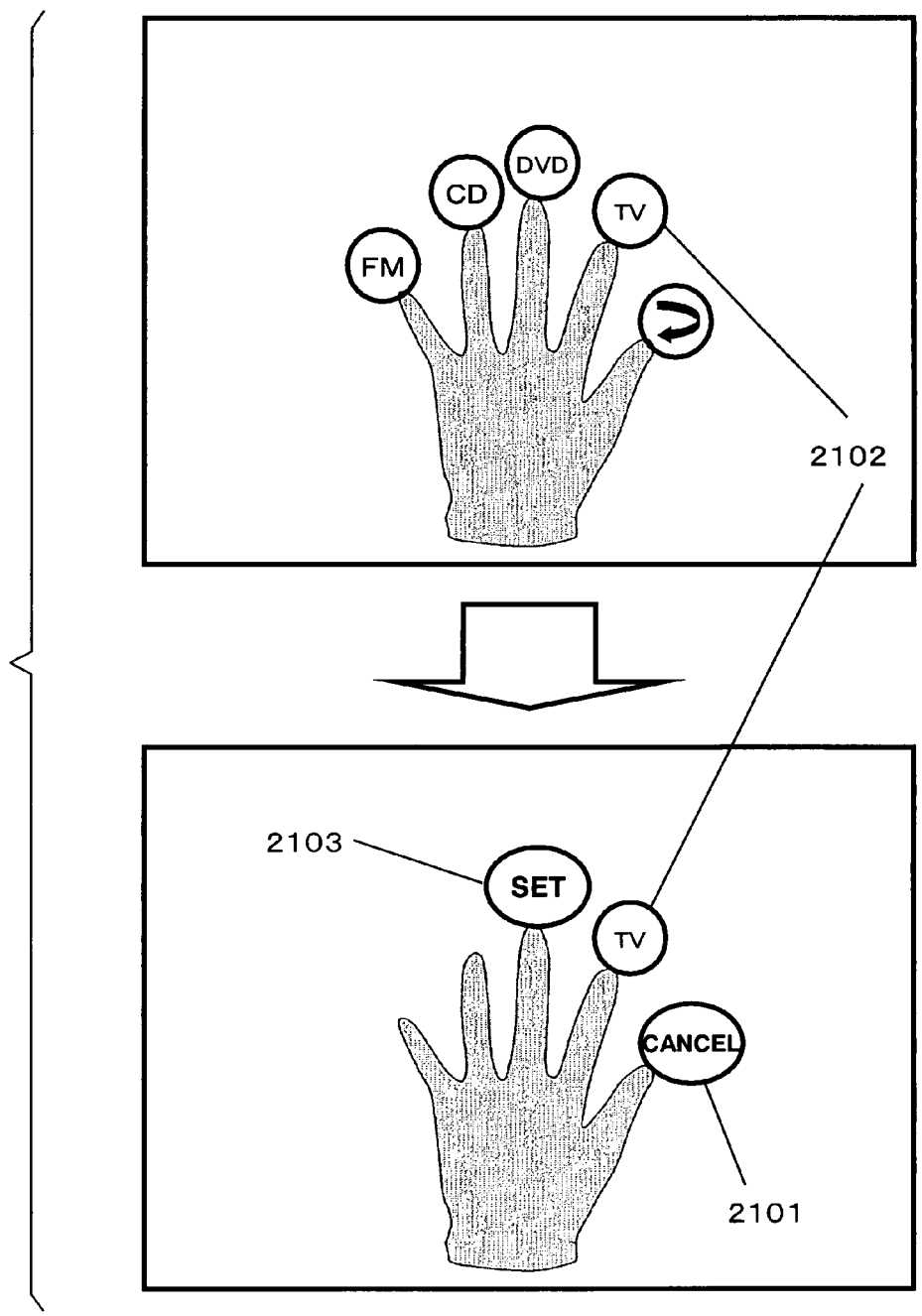
FIG. 21 shows an exemplary display obtained when the GUI components used in the user interface system 1 or 11 shown in FIG. 1 or 8 are assigned to the fingers, and an exemplary display obtained when a finger remains at a position detected by a contact position detecting section.

Furthermore, in a case where the GUI components are operated, instead of executing a function when a finger contacts one of the GUI components, the function may be executed when the finger of the user is removed from the pointing device 12 after contacting the one of the GUI components. In this case, it is possible to display a cancel button 2101 as shown in FIG. 21. Thus, when the user notices an error after he or she pressed down the pointing device 12 so as to execute a function, it is possible to cancel the function to be executed.

Furthermore, FIG. 21 shows another case where the TV button remains pressed down by the user. In this case, a function of the button remaining pressed down is executed, and a button to be subsequently displayed is not only limited to a cancel button. A GUI component representing a setting button 2103 operable to perform a detailed setting before the function is executed may be also displayed together with the cancel button, for example.

In the above embodiment, the user interface system displays a hand shape. However, by causing the image generating section 145 to execute a process of not displaying the hand shape when the GUI components respectively assigned to the fingertips are displayed, it becomes possible to improve a visibility of a screen.

Figure 22:
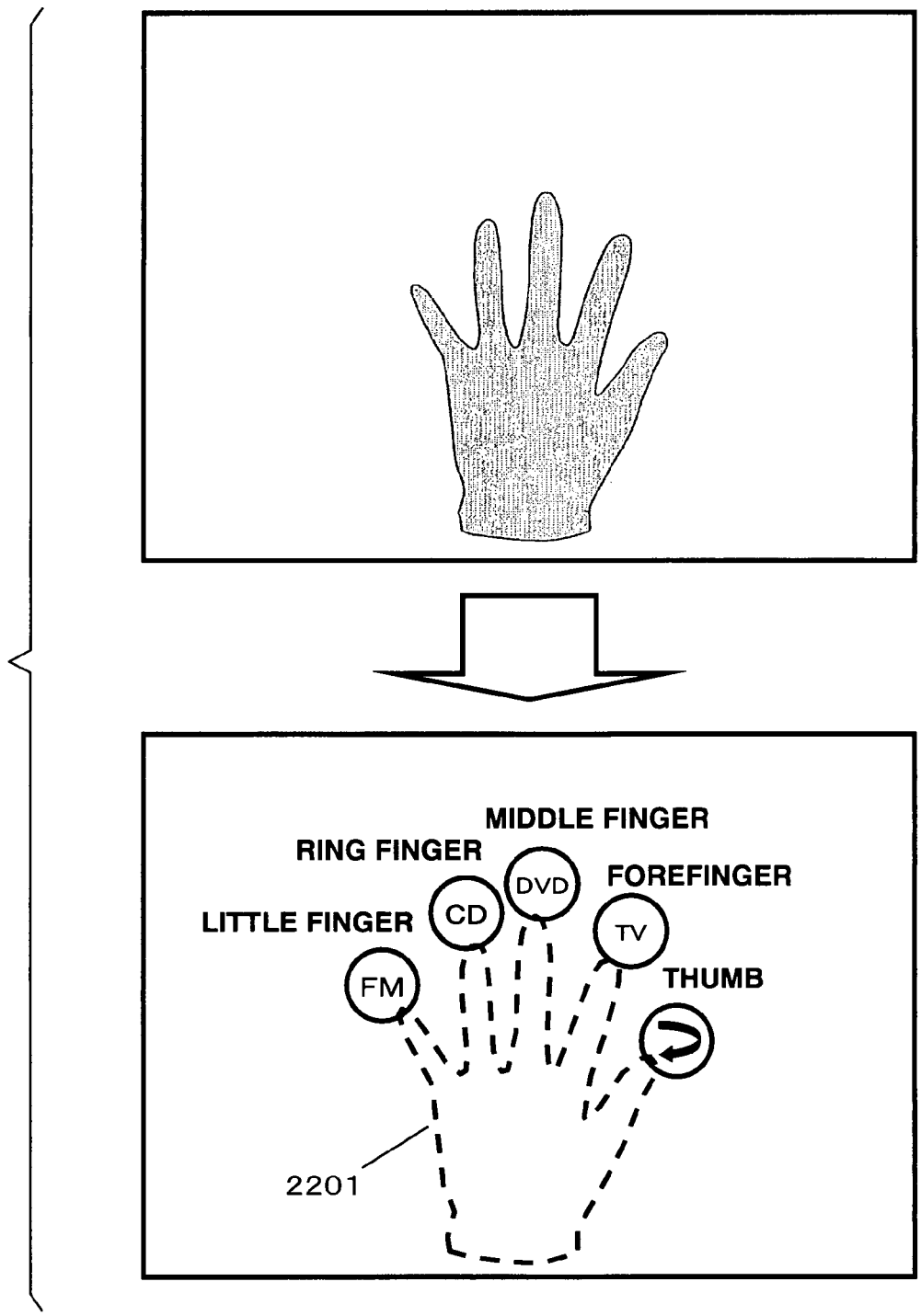
FIG. 22 shows an exemplary case where a display of a hand shape is erased when displaying the GUI components.

When the user interface system does not display the hand shape, it is difficult for the user to understand a finger type to each of the GUI components corresponds. Thus, it is desirable to display a finger type to which each of the GUI components corresponds above each of the GUI components assigned by the component assigning section 144. FIG. 22 shows an exemplary display of the GUI components obtained when no hand shape is displayed. In this case, a hand shape 2201 is not displayed.

Note that a finger name displayed above each of the GUI components is not limited to that shown in FIG. 22. As an example, a method, of displaying a number corresponding to each of the fingers, such as land 2 indicating the thumb and the forefinger, respectively, may be used. In this case, it is desirable that the number corresponding to each of the fingers is displayed by the display device 16.

Figure 23:
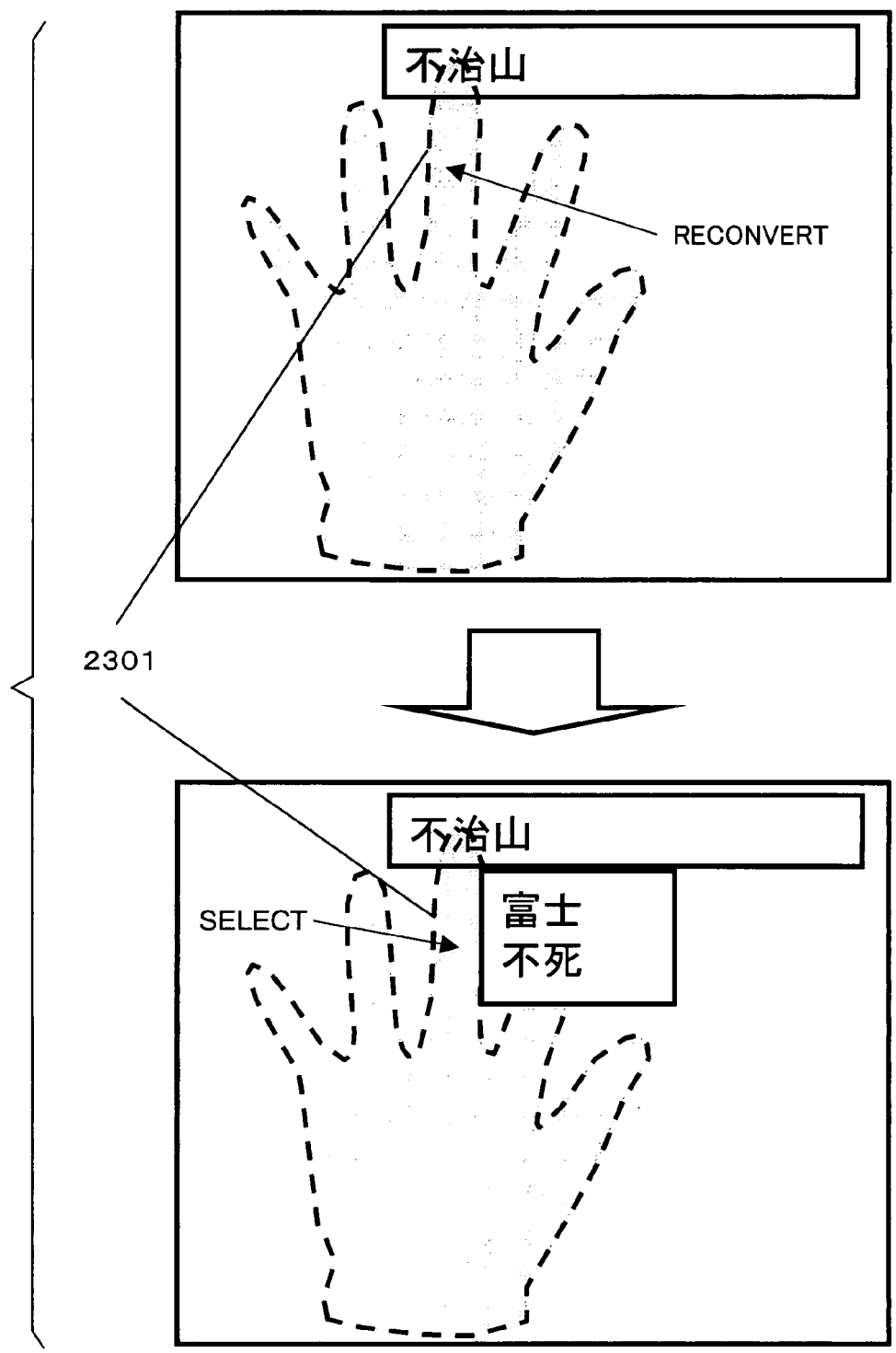
FIG. 23 shows an exemplary display obtained when a function is assigned to a finger so as to operate the GUI component.

Furthermore, in the aforementioned embodiment and variant, there may be a case where any of the GUI components assigned by the component assigning section 34 or 144 does not individually issues a control instruction. A specific example of this is a case where a character string reconverting function shown in FIG. 23 is assigned to a GUI component. In this case, even if a reconverting control instruction, assigned to the GUI component corresponding to a fingertip, is individually issued, a calculator cannot determine what should be reconverted. Therefore, an object to be reconverted is required. In FIG. 23, are converting function is assigned to a finger 2301, thereby making it possible to reconvert a text existing in a position instructed by the finger 2301.

Still furthermore, the GUI component, to which a continuous value indicated by a slider bar, for example, can be inputted, may be displayed. In this case, the contact position detecting section 37 or 146 firstly detects a contact of the finger, and then detects a movement in which a position of the finger is determined to be shifted, thereby detecting a drag operation. Thus, it becomes possible to operate the slider bar.

Figure 24A:
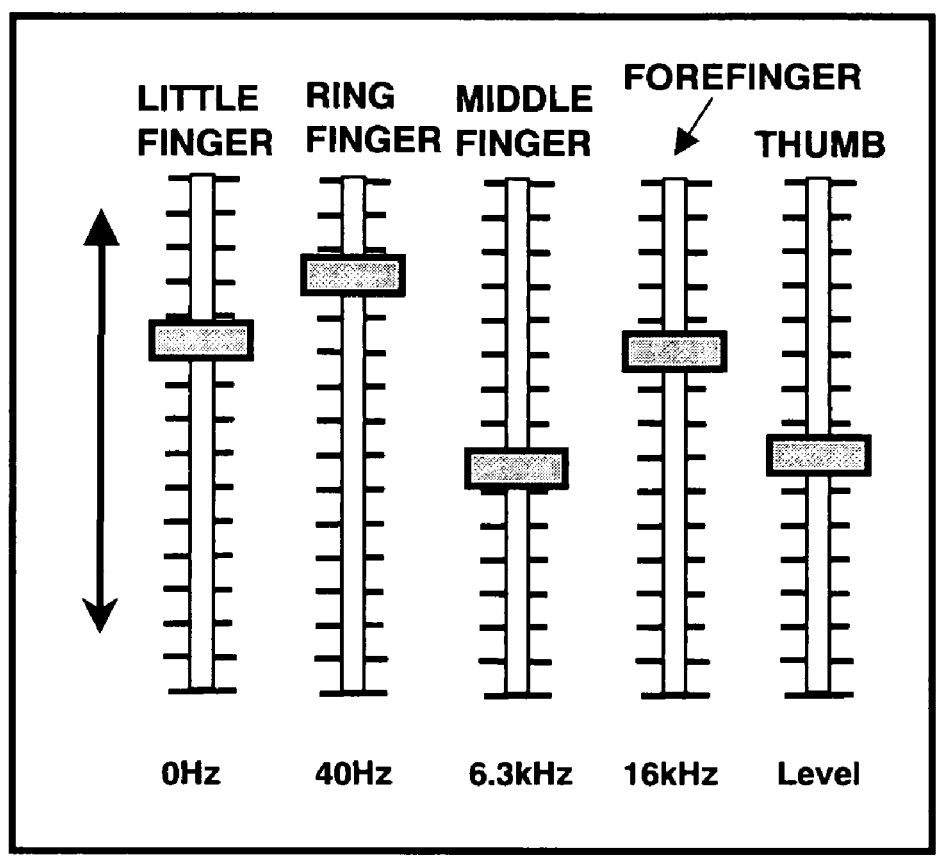
FIG. 24A shows an exemplary case where the GUI components, respectively associated with the fingers, are operated.
Figure 24B:
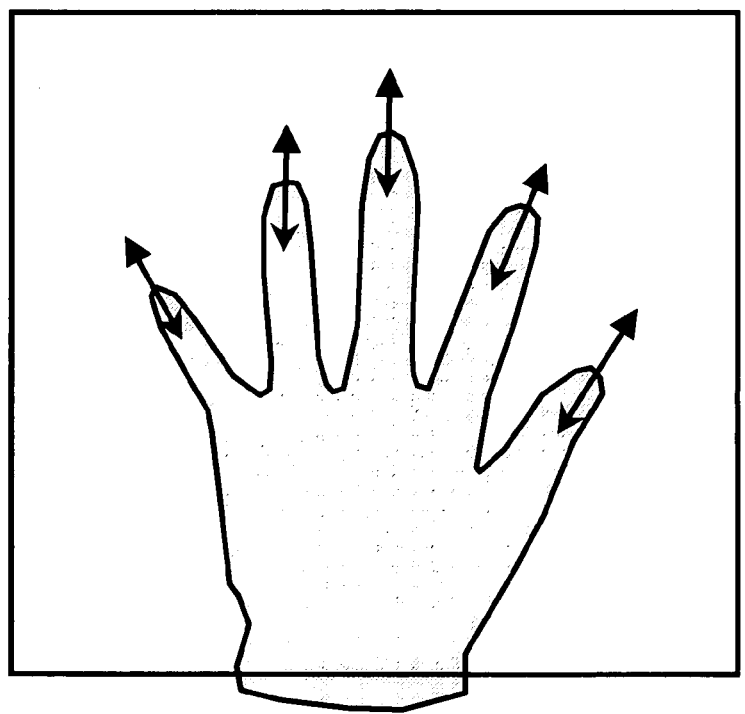
FIG. 24B shows exemplary finger movements obtained when operating the GUI components shown in FIG. 24A.

A specific example of this is a case where when adjusting an acoustic environment inside a vehicle as shown in FIG. 24, the GUI component, to which the continuous value indicated by the slider bar, for example, can be inputted in accordance with a frequency range to be adjusted, is displayed, thereby adjusting the acoustic environment. In this case, when the GUI component is displayed as shown in FIG. 24A, the hand shape detected by the contact position detecting section is, as shown in FIG. 24B, moves as if it scratched the displayed GUI component. With the hand shape moved in such a manner as described above, a position of a finger corresponding to the GUI component assigned to each of the finger types displayed in FIG. 24A is moved while being in contact with the GUI component, thereby increasing or decreasing a value indicated by the slider bar. Note that when a slider bar is displayed, a finger type by which the slider bar is operated is preferably displayed, as shown in FIG. 24A.

Figure 25A:
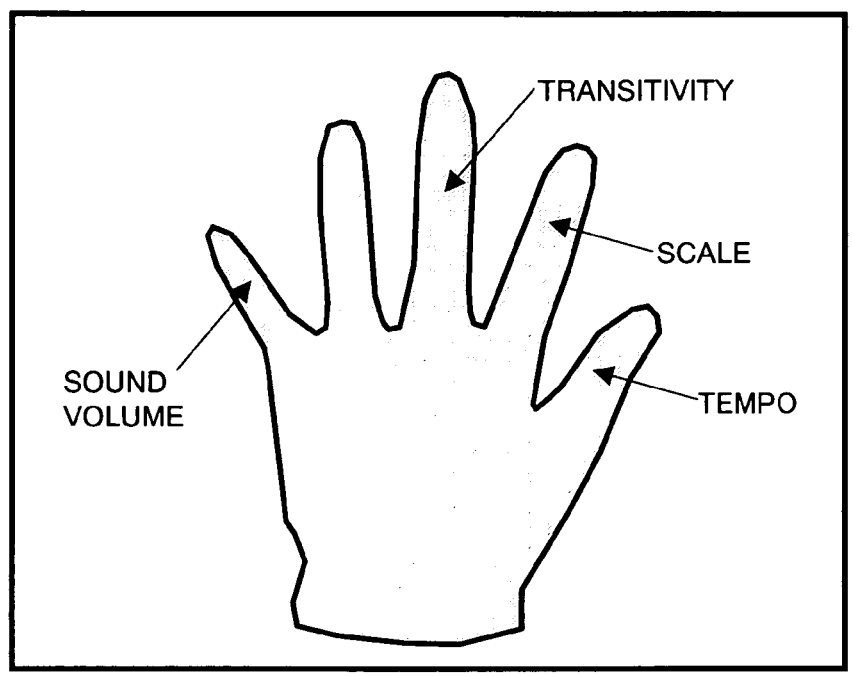
FIG. 25A shows an exemplary display obtained when functions executed by the user interface system 1 or 11 shown in FIG. 1 or 8 are assigned to the fingers.

Furthermore, the user interface system according to the present invention comprises the finger identifying section 33 or 143, thereby determining a finger type to which a function is assigned. In the aforementioned embodiment and variant, a function is executed when the contact position detecting section 37 or 147 detects the contact of the finger. Here, it is assumed that a function is assigned to each of the fingers as shown in FIG. 25A. When four of the fingers are bent so as to be in a state where only one of the fingers is fully extended as shown in FIG. 25B, i.e., in a state where only one fingertip is detected, a function assigned to the extended finger can be executed. Specifically, FIG. 25B shows an exemplary case where a scale changing function assigned to a finger 2501 is executed. As shown in FIG. 25B, the finger 2501 is a last finger remaining extended, and the scale changing function assigned to the finger 2501 is executed, thereby shifting a scale indicated by the slider bar.

While the invention has been described in detail, the foregoing description is in all aspects illustrative and not restrictive. It is understood that numerous other modifications and variations can be devised without departing from the scope of the invention.

INDUSTRIAL APPLICABILITY

A user interface system according to the present invention is suitable for a computer-related product or the like, which requires a good usability.

The invention claimed is:
1. A user interface system comprising:
an operation section for receiving an instruction inputted by a user;
an image pickup device set so as to be able to image an operation performed with a hand of the user;
a finger position detecting section for detecting, in an image captured by the image pickup device, a group of first coordinate values respectively indicating current positions of fingertips of the user, which are placed on an operation surface of the operation section;
a finger identifying section for identifying, in the image captured by the image pickup device, a plurality of finger types to which the first coordinate values, detected by the finger position detecting section, respectively correspond;
a component storing section for storing component data representing GUI (Graphical User Interface) components;
an assignment section for uniquely assigning the component data stored in the component storing section to the first coordinate values corresponding to the plurality of finger types identified by the finger identifying section;

an image generating section for generating a GUI image representing a user interface in which the GUI components represented by the component data stored in the component storing section are uniquely associated with the first coordinate values corresponding to the plurality of finger types identified by the finger identifying section, in accordance with an assignment performed by the assignment section; and a display controlling section for displaying the GUI image generated by the image generating section on a display screen.

2. The user interface system according to claim 1, further comprising a function executing section for erasing one of the GUI components associated with a finger bent by the user among fingers included in a hand image captured by the image pickup device, and for executing a function of one of the GUI components which is assigned to one of the coordinate values indicating one of the current positions of the fingertips corresponding to a last remaining finger.

3. The user interface system according to claim 1, wherein the image generating section generates the GUI image in which the positions indicated by the first coordinate values corresponding to the plurality of finger types identified by the finger identifying section are respectively connected, by lines, to the GUI components represented by the component data assigned by the assignment section.

4. The user interface system according to claim 1, wherein the image generating section respectively superimposes the GUI components represented by the component data assigned by the assignment section on a display image at the positions indicated by the first coordinate values corresponding to the plurality of finger types identified by the finger identifying section or in a vicinity thereof.

5. The user interface system according to claim 1, wherein the finger identifying section further identifies whether the fingertips corresponding to the identified plurality of finger types belong to a right hand or a left hand, and the assignment section respectively assigns the component data, which are different from each other and which are stored in the component storing section, to the first coordinate values corresponding to the plurality of finger types identified by the finger identifying section in accordance with a hand type identified by the finger identifying section.

6. The user interface system according to claim 1, wherein the image generating section generates the GUI image in which a size of each of the GUI components stored in the component storing section is changed in accordance with the first coordinate values detected by the finger position detecting section.

7. The user interface system according to claim 1, further comprising:

a contact position detecting section for detecting a second coordinate value indicating a position, on the operation surface of the operation section, which is in contact with the user;

a contact finger determining section for specifying one of the GUI components uniquely assigned to one of the first coordinate values which substantially coincides with the second coordinate value; and a function executing section for executing a function assigned to one of the GUI components which is specified by the contact finger determining section.

8. The user interface system according to claim 1, wherein in response to an operation performed by the user, the assignment section reassigns the component data, once uniquely assigned to the first coordinate values corresponding to the plurality of finger types identified by the finger identifying section, to other component data.

9. The user interface system according to claim 8, wherein the operation surface of the operation section is divided into a plurality of partial areas, and a plurality of types of appliances to be controlled by the user interface system are uniquely assigned to the plurality of partial areas, and the assignment section respectively assigns, to the first coordinate values, the component data representing one of the plurality of types of appliances uniquely assigned to one of the plurality of partial areas which corresponds to a position of the hand of the user.

10. The user interface system according to claim 1, wherein the assignment section assigns no component data to one of the first coordinate values indicating one of the positions of the fingertips corresponding to a specific finger type, and uniquely assigns the component data, which are different from each other between a plurality of types of appliances to be controlled by the user interface system, to the other first coordinate values indicating the positions of the fingertips corresponding to remaining finger types, and the image generating section displays, for one of the plurality of types of appliances which is currently being selected in response to an operation performed with one of the fingertips corresponding to the specific finger type, the GUI image in which the other first coordinate values, indicating the positions of the fingertips corresponding to the remaining finger types which are identified by the finger identifying section, are uniquely associated with the component data which are stored in the component storing section and which are assigned to the fingertips corresponding to the remaining finger types.

11. The user interface system according to claim 7, wherein the assignment section assigns a plurality of pieces of the component data, which are previously determined, to a predetermined finger, the image generating section respectively disposes the GUI components represented by the plurality of pieces of the component data at positions which are in the vicinity of the first coordinate values indicating the current positions of the fingertips of the user and which do not overlap with each other, when the user contacts at least two points on the operation surface of the operation section, the contact position detecting section detects the second coordinate value indicating an initial contact position and further detects the second coordinate value indicating a second contact position, in response to the respective contacts performed by the user, the contact finger determining section specifies the finger type the user uses to contact the operation surface, based on the second coordinate value which indicates the initial contact position and which is detected by the contact position detecting section and the first coordinate values corresponding to the plurality of finger types identified by the finger identifying section, and further specifies one of the GUI components currently designated by the user based on the second coordinate value which indicates the second contact position and which is detected by the contact position detecting section and the GUI components represented by the plurality of pieces of the component data assigned to the specified finger type.

12. A display method used in a user interface system, the display method comprising:
- an operation step of receiving, with an operation section of the user interface system, an instruction inputted by a user;
- an image pickup step of imaging an operation performed with a hand of the user;
- a finger position detecting step of detecting, in an image captured in the image pickup step, a group of first coordinate values respectively indicating current positions of fingertips of the user which are placed on an operation surface of the operation section;
- a finger identifying step of identifying, in the image captured in the image pickup step, a plurality of finger types to which the first coordinate values, detected in the finger position detecting, step, respectively correspond;
- an assignment step of uniquely assigning component data, which are stored in a memory device included in the user interface system and which represent GUI (Graphical User Interface) components, to the first coordinate values corresponding to the plurality of finger types identified by the finger identifying step;
- an image generating step of generating a GUI image representing a user interface in which the GUI components stored in the memory device are uniquely associated with the first coordinate values corresponding to the plurality of finger types identified by the finger identifying step, in accordance with an assignment performed by the assignment step; and
- a display controlling step of displaying the GUI image generated by the image generating step on a display screen included in the user interface system.

* * * * *